(12) United States Patent
Graf et al.

(10) Patent No.: US 10,521,074 B2
(45) Date of Patent: Dec. 31, 2019

(54) SYSTEM AND METHOD FOR A BACK STACK IN A MULTI-APPLICATION ENVIRONMENT

(71) Applicant: Dell Products, LP, Round Rock, TX (US)

(72) Inventors: Knut Graf, Austin, TX (US); Mark W. Welker, Westlake, TX (US); Abu S. Sanaullah, Austin, TX (US); Jorge A. Abullarade, Austin, TX (US); Kenneth W. Stufflebeam, Georgetown, TX (US); Deeder M. Aurongzeb, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 635 days.

(21) Appl. No.: 14/448,840

(22) Filed: Jul. 31, 2014

(65) Prior Publication Data

US 2016/0034597 A1 Feb. 4, 2016

(51) Int. Cl.
*G06F 3/0482* (2013.01)
*G06F 9/451* (2018.01)
(Continued)

(52) U.S. Cl.
CPC ............ *G06F 3/0482* (2013.01); *G06F 9/451* (2018.02); *G06F 9/461* (2013.01); *G06F 1/1637* (2013.01); *G06F 2203/04803* (2013.01)

(58) Field of Classification Search
CPC ......... G06F 2203/04803; G06F 1/1637; G06F 9/4443
See application file for complete search history.

(56) References Cited

U.S. PATENT DOCUMENTS 6,094,341 A 7/2000 Lin
6,590,593 B1 * 7/2003 Robertson ............. G06F 3/0481
715/782

(Continued)

FOREIGN PATENT DOCUMENTS

WO WO 2012/044516 A2 4/2012
WO WO 2013/107318 A1 7/2013

OTHER PUBLICATIONS

N. Ravi, J. Scott, H. Lu, L. Iftode, "Context-aware Battery Management for Mobile Phones," In Pervasive Computing and Communications, p. 224-233, 2008, p. 1-10.

(Continued)

*Primary Examiner* — Nicholas Klicos
(74) *Attorney, Agent, or Firm* — Prol Intellectual Property Law, PLLC; H. Kenneth Prol

(57) ABSTRACT

A system and method for a back stack in a multi-application environment, wherein the method comprises adding an entry to a last-in-first-out (LIFO) data structure, the entry comprising application state information descriptive of an application state of a software application and display state information descriptive of a display state of a display surface of a touch screen device, adjusting a LIFO data structure pointer to reflect a revised LIFO data structure state resulting from the adding the entry, receiving a back button actuation indication, in response to receiving the back button actuation indication, restoring the software application to the application state and restoring the display surface to the display state, and readjusting the LIFO data structure pointer to reflect an original LIFO data structure state that existing prior to the adding the entry.

20 Claims, 15 Drawing Sheets

(51) Int. Cl.
*G06F 9/46* (2006.01)
*G06F 1/16* (2006.01)

(56) References Cited

U.S. PATENT DOCUMENTS

| | | | |
|---|---|---|---|
| 7,136,282 B1 | 11/2006 | Rebeske | |
| 7,821,780 B2 | 10/2010 | Choy | |
| 8,904,479 B1* | 12/2014 | Johansson | G06F 21/36 |
| | | | 382/181 |
| 2003/0142469 A1 | 7/2003 | Ponx | |
| 2005/0010876 A1* | 1/2005 | Robertson | G06F 3/0481 |
| | | | 715/782 |
| 2005/0050555 A1* | 3/2005 | Exley | G06F 9/541 |
| | | | 719/328 |
| 2005/0171950 A1* | 8/2005 | Dumitru | G06F 17/3089 |
| 2005/0197141 A1* | 9/2005 | Jiang | G06F 17/30876 |
| | | | 455/457 |
| 2005/0237269 A1 | 10/2005 | Connor et al. | |
| 2005/0268301 A1* | 12/2005 | Kelley | G06F 9/4843 |
| | | | 718/100 |
| 2005/0288001 A1* | 12/2005 | Foster | H04L 67/04 |
| | | | 455/418 |
| 2006/0026535 A1 | 2/2006 | Hotelling et al. | |
| 2006/0077120 A1* | 4/2006 | Domi | G06F 3/0488 |
| | | | 345/2.3 |
| 2006/0109259 A1 | 5/2006 | Ohta | |
| 2007/0006238 A1* | 1/2007 | Finger | G06F 9/485 |
| | | | 719/328 |
| 2008/0027590 A1* | 1/2008 | Phillips | G05D 1/0088 |
| | | | 701/2 |
| 2008/0163127 A1* | 7/2008 | Newell | G06F 17/30873 |
| | | | 715/854 |
| 2009/0262074 A1* | 10/2009 | Nasiri | A63F 13/06 |
| | | | 345/158 |
| 2009/0296331 A1 | 12/2009 | Choy | |
| 2009/0303204 A1* | 12/2009 | Nasiri | A63F 13/06 |
| | | | 345/184 |
| 2010/0031203 A1 | 2/2010 | Morris et al. | |
| 2010/0319006 A1* | 12/2010 | Allen | G06F 11/1438 |
| | | | 719/318 |
| 2010/0321275 A1* | 12/2010 | Hinckley | G06F 1/1618 |
| | | | 345/1.3 |
| 2011/0032199 A1 | 2/2011 | Seo et al. | |
| 2011/0066982 A1* | 3/2011 | Paulsami | G06F 3/0482 |
| | | | 715/835 |
| 2011/0102299 A1* | 5/2011 | Hochmuth | G06F 3/1438 |
| | | | 345/1.2 |
| 2012/0047488 A1* | 2/2012 | Ambichl | G06F 11/368 |
| | | | 717/124 |
| 2012/0084714 A1* | 4/2012 | Sirpal | G06F 1/1616 |
| | | | 715/790 |
| 2012/0084721 A1* | 4/2012 | Gimpl | G06F 1/1616 |
| | | | 715/800 |
| 2012/0260220 A1* | 10/2012 | Griffin | G06F 3/033 |
| | | | 715/863 |
| 2012/0290965 A1* | 11/2012 | Ignor | G06F 3/0482 |
| | | | 715/777 |
| 2013/0021379 A1* | 1/2013 | Sirpal | G06F 1/1616 |
| | | | 345/659 |
| 2013/0058063 A1 | 3/2013 | O'Brien | |
| 2013/0076591 A1* | 3/2013 | Sirpal | G06F 3/1438 |
| | | | 345/1.3 |
| 2013/0104062 A1* | 4/2013 | Reeves | G06F 1/1641 |
| | | | 715/761 |
| 2013/0127905 A1 | 5/2013 | Zhang et al. | |
| 2013/0167058 A1* | 6/2013 | LeVee | G06F 3/0482 |
| | | | 715/768 |
| 2013/0187861 A1* | 7/2013 | Lavallee | G06F 9/543 |
| | | | 345/173 |
| 2013/0201101 A1 | 8/2013 | Niu et al. | |
| 2013/0342094 A1 | 12/2013 | Walters | |
| 2014/0002327 A1* | 1/2014 | Toren | G06F 3/1423 |
| | | | 345/1.1 |
| 2014/0009445 A1 | 1/2014 | Kim et al. | |
| 2014/0111954 A1 | 4/2014 | Lee | |
| 2014/0247198 A1 | 9/2014 | Yang et al. | |
| 2014/0344721 A1* | 11/2014 | Prakash | H04M 1/274508 |
| | | | 715/753 |
| 2014/0365957 A1* | 12/2014 | Louch | G06F 3/1431 |
| | | | 715/790 |

OTHER PUBLICATIONS

Marek Novotny, "Microsensors for Contactless Angle Sensing," Sep. 23, 2014 http://www.ac.tut.fi/aci/courses/ACI-51106/pdf/Angle/AngleSensing.pdf, p. 1-9.

"This End Up: Using Device Orientation," by Pete LePage, Apr. 29, 2011, http://www.html5rocks.com/en/tutorials/device/orientation/, p. 1-17.

Sony Tablet p—Dual screen for maximum mobility, Get more done on the go with two 13.9 cm (5.5") touch screens, 1GB RAM, MicroSD card storage, ultra light and compact design, Wi-Fi and 3G, http://www.sony.co.uk/product/sony-tablet-p/tab/overview, p. 1-12.

"NEC Unveils Bizarre Dual-Screen Medias W N-05E," CNET Editor's Take, Aug. 28, 2013, http://www.cnet.com/products/nec-medias-w-n-05e/, p. 1-8.

"Position Sensors; Android Developers," Sep. 6, 2013; http://developer.android.com/guide/topics/sensors/sensors_position.html, p. 1-5.

"Passive and Active Cooling Modes," Oct. 12, 2013, http://msdn.microsoft.com/en-us/library/windows/hardware/hh698271(v=vs.85).aspx, p. 1-2.

"A Procedure for Developing Intuitive and Ergonomic Gesture Interfaces for Man-Machine Interaction," M. Nielsen et al., Aalborg University, Laboratory of Computer Vision and Media Technology, Denmark, Technical Report CVMT 03-01, ISSN 1601-3646, CVMT, Aalborg University, Mar. 2003, pp. 1-12.

"Hidden Apple Patent for Flexible Display Devices Discovered," Patently Apple, Jan. 11, 2014, http://www.patentlyapple.com/patently-apple/2014/01/hidden-apple-patent-for-flexible-display-devices-discovered.html, p. 1-12.

"Apple Patents iPad Smart Magnets, used to Attach Gizmos Like Controllers or Cameras," James A., Feb. 20, 2014, https://tablet-news.com/apple-patents-ipad-smart-magnets-used-to-attach-gizmos-like-controllers-or-cameras/, p. 1-3.

"Apples's Wrap-Around Display Tech Could Kill Off Those Pesky Bezels [Patent]," Luke Dormehl, Feb. 13, 2014, https://www.cultofmac.com/266383/apples-wrap-around-display-tech-kill-pesky-bezels-patent/, p. 1-8.

"Talk about Timing: Apple's iWatch Patent Arrives," Patently Apple, Feb. 21, 2013, http://www.patentlyapple.com/patently-apple/2013/02/talk-about-timing-apples-wristwatch-patent-arrives.html, p. 1-6.

"Power-Saving Color Transformation of Mobile Graphical User Interfaces on OLED-based Displays," M. Dong et al., Aug. 19, 2009, p. 1-4.

* cited by examiner

SYSTEM AND METHOD FOR A BACK STACK IN A MULTI-APPLICATION ENVIRONMENT

CROSS REFERENCE TO RELATED APPLICATIONS

Related subject matter is contained in the following co-pending application:

This application is related to U.S. patent application Ser. No. 14/448,894, entitled "System and Method for Using Single-Display Application Programs on a Multi-Display Device," by Knut Graf et al., filed of even date herewith, which is hereby incorporated by reference.

This application is related to U.S. patent application Ser. No. 14/299,204, entitled "Method and System of Detecting Subsystem Input Power without Using Sense Component," by Shiguo Luo et al., filed on Jun. 9, 2014, which is hereby incorporated by reference.

FIELD OF THE DISCLOSURE

The present disclosure generally relates to information handling systems, and more particularly relates to a use of a single-display application on a multi-display device.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. The hardware resources can include touch screens.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
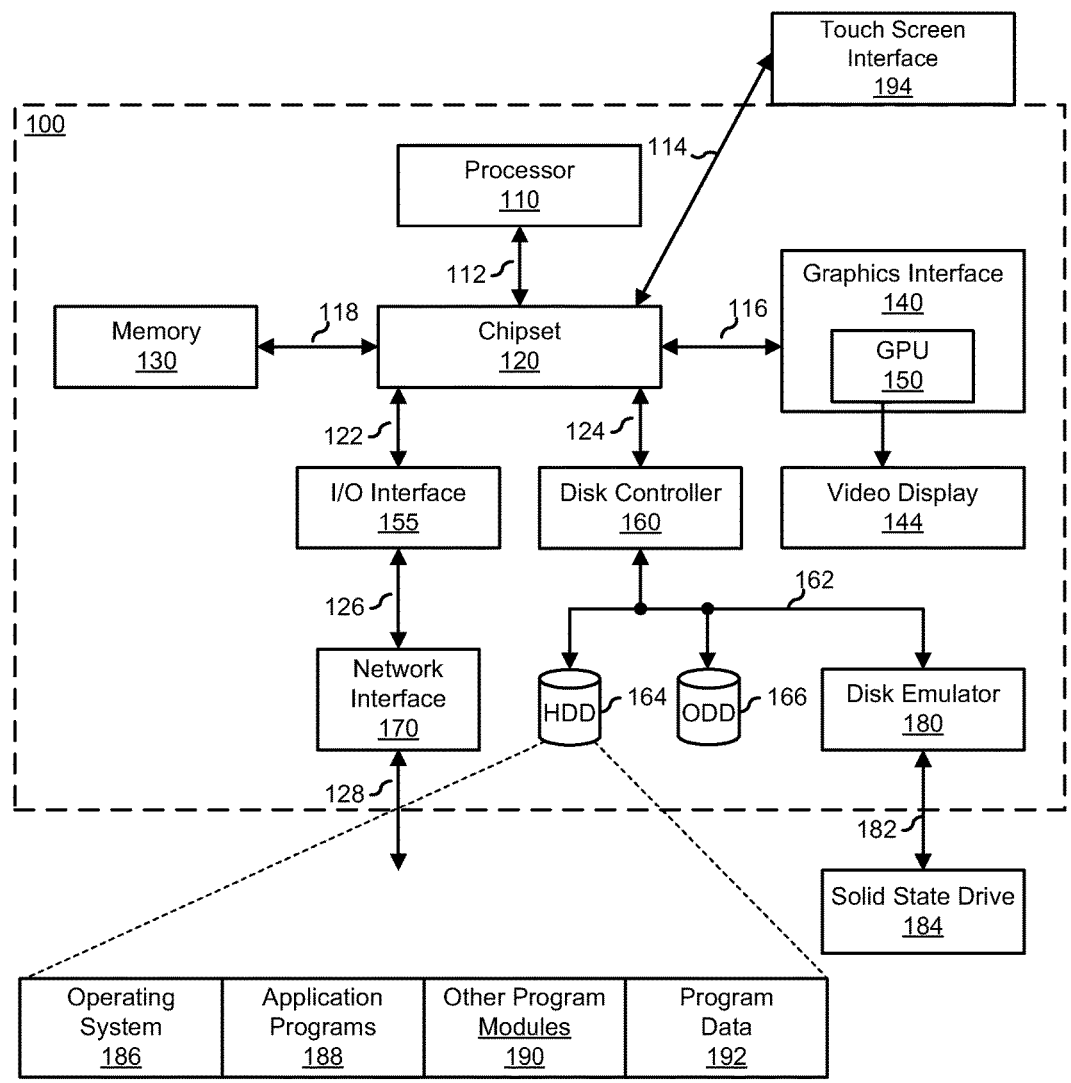
FIG. 1 is a block diagram illustrating an information handling system 100 according to an embodiment of the present disclosure.

FIG. 1 is a block diagram illustrating an information handling system 100 according to an embodiment of the present disclosure. For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a tablet, a PDA/smartphone, a consumer electronic device, a network server or storage device, a switch router, wireless router, or other network communication device, or any other suitable device and can vary in size, shape, performance, functionality, and price. Information handling systems can include processing resources, such as a central processing unit (CPU) or hardware or software control logic, and can operate to execute code.

The information handling system 100 can include a physical processor 110 coupled to chipset 120 via host bus 112. Physical processor 110 can operate to execute code. Other embodiments can include additional processors coupled to a chipset. In further embodiments, each processor can be connected to the chipset via a separate host bus. In these embodiments, the chipset can support multiple processors and can allow for simultaneous processing of multiple processors and support the exchange of information within an information handling system during multiple processing operations. In other embodiments, processing resources of an information handling system can include hardware or software control logic.

According to one aspect, the chipset 120 can be referred to as a memory hub or a memory controller. For example, the chipset 120 can include an Accelerated Hub Architecture (AHA) and can include a memory controller hub and an input/output (I/O) controller hub. As a memory controller hub, the chipset 120 can function to provide access to physical processor 110 using the host bus. The chipset 120 can also provide a memory interface for accessing memory 130 using memory bus 118. In a particular embodiment, the memory bus 118 and the host bus 112 can be individual buses or part of the same bus. The chipset 120 can also provide bus control and can handle transfers between the buses when there are multiple buses.

According to another aspect, the chipset 120 can be generally considered an application specific chipset that provides connectivity to various buses, and integrates other system functions. For example, the chipset 120 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 120. The chipset 120 can also be packaged as an application specific integrated circuit (ASIC).

The information handling system 100 can also include a graphics interface 140 that can be coupled to the chipset 120 using bus 116. In one form, the graphics interface 140 can be a Peripheral Component Interconnect (PCI) Express interface to display content within a video display 144. Other graphics interfaces can also be used. The graphics interface 140 can provide a video display output to the video display 144. The video display 144 can include one or more types of video displays such as a flat panel display (FPD) or other type of display device. In some embodiments, information handling system 100 can be a video game controller and video display 144 can be a television console.

The information handling system 100 can also include an I/O interface 155 that can be connected via I/O bus 122 to the chipset 120. The I/O interface 155 and I/O bus 122 can include industry standard buses or proprietary buses and respective interfaces or controllers. For example, the I/O bus can also include a PCI bus or a high speed PCI-Express bus. PCI buses and PCI-Express buses can be provided to comply with industry standards for connecting and communicating between various PCI-enabled hardware devices. Other buses can also be provided in association with, or independent of, I/O bus 122 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 120 can be a chipset employing a Northbridge/Southbridge chipset configuration (not illustrated). For example, a Northbridge portion of the chipset 120 can communicate with the processor 110 and can control interaction with the memory 130, the I/O bus that can be operable as a PCI bus, and activities for the graphics interface 140. In many embodiments, graphics interface 140 can be a separate graphics card. Graphics interface 140 includes graphics processing unit 150. The Northbridge portion can also communicate with the processor 110 using the host bus. The chipset 120 can also include a Southbridge portion (not illustrated) of the chipset 120 and can handle I/O functions of the chipset 120. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a network interface 170 connected to I/O interface 155 via bus 126. In a particular embodiment, bus 126 and I/O bus 122 can be individual buses or part of the same bus. The network interface 170 can provide connectivity to a network 128, e.g., a wide area network (WAN), a local area network (LAN), wireless network (IEEE 802), or other network. The network interface 170 can also interface with macrocellular networks including wireless telecommunications networks such as those characterized as 2G, 3G, or 4G or similar wireless telecommunications networks similar to those described above. The network interface 170 can be a wireless adapter having antenna systems for various wireless connectivity and radio frequency subsystems for signal reception, transmission, or related processing.

The information handling system 100 can further include a disk controller 160 connected to chipset 120 via bus 124. In a particular embodiment, bus 124 and host bus 112 can be individual buses or part of the same bus. Disk controller 160 can include a disk interface 162 that connects disc controller 160 to one or more internal disk drives such as a hard disk drive (HDD) 164 and an optical disk drive (ODD) 166 such as a Read/Write Compact Disk (R/W CD), a Read/Write Digital Video Disk (R/W DVD), a Read/Write mini-Digital Video Disk (R/W mini-DVD), or other type of optical disk drive. Disk controller 160 is also connected to disk emulator 180. An example of disk interface 162 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 180 permits a solid-state drive 184 to be coupled to information handling system 100 via an external interface 182. An example of external interface 182 includes a USB interface, an IEEE 1394 (Firewire) interface, a proprietary interface, or a combination thereof. Alternatively, solid-state drive 184 can be disposed within information handling system 100.

The disk drive units 164 and 166 and solid state drive 184 can include a computer-readable medium in which one or more sets of instructions such as software can be embedded. Further, the instructions can embody one or more of the methods or logic as described herein. In a particular embodiment, the instructions can reside completely, or at least partially, within memory 130 and/or within processor 110 during execution by the information handling system 100. Memory 130 and processor 110 also can include computer-readable media. In the embodiment of FIG. 1, disk drive unit 164 contains operating system 186, application programs 188 (often referred to as "apps"), other program modules 190, and program data 192.

Information handling system 100 also includes touch screen interface 194 connected to chipset 120 via a bus 114. Touch screen interface 194 can provide a touch interface to users. A touch screen can consist of a surface that reacts to the touch of a user, enabling the user to enter input. The touch can be performed by a finger of the user or by a variety of pen-shaped instruments, such as a stylus and an active pen. These instruments will be referred to as user input instruments. Some embodiments of a touch screen can also recognize and react to a user input instrument placed near the surface of the touch screen. The touch screen also serves as a display. In other embodiments, a touch screen interface can be directly connected to a processing unit. In addition, a touch screen interface can be connected to a processing unit via a serial port, parallel port or other interface as known in the art.

Application programs 188 can generate displays on a touch screen and touch screen interface 194 can enable a user to interact with the application programs 188. Data used to produce the displays can be stored in program data 192. The displays can include objects—programming constructs that enable user interaction and that possess properties in addition to pure display properties. Thus, pure bit map regions are not objects. Programs that process text, such as word processing programs and spreadsheets, can create words as objects. A user can interact with these objects in order to change the size or type of font, correct typographical errors, change the capitalization, and other features. A spread sheet program can also create cells as objects. Programs can create other graphical images that a user can interact with by selecting through touch screen interface 194. A map program can generate multiple vector objects for display in a map image. The map program can, for instance, generate vector objects to represent buildings, businesses, intersections, or other portions of a region. The user may be able to determine properties of the represented objects by interacting with the graphical images of the objects on a map. By manipulating an object of the program, a user can determine directions to the object or other information about the portion of the region represented, such as contact information, business hours, or business name. Similarly, a drawing program can generate objects that a user can manipulate by changing the size, line thickness, location, or other properties. The objects created by drawing programs and other programs creating images can include vector objects, such as lines, polygons, and Bezier curves.

The objects generated by application programs 188 may have a granularity larger than the pixel level of images produced by the programs. As a result, portions of an object may not themselves be objects and possess the properties of objects. Thus, in a drawing program, for example, properties such as the weight or pattern of a line apply only to objects, and not to portions of an object that are not themselves objects.

A controller can mediate between the program and the touch screen to control the display of objects created by the program. In the case of a text processing program, for example, the controller can be a standard controller for the display of text. Many text controllers can implement the display of text in accordance with rich text format (RTF) characteristics. Given a command to display text with specified RTF characteristics, such as a font size and font color, the text controller can generate the proper text display on the touch screen.

In the embodiment of FIG. 1, holding a user input instrument near the touch screen can cause an emphasis of the display of objects near the user input instrument. In some embodiments, objects nearer the user input instrument can be displayed with a greater emphasis than objects further from the user input instrument. Further, the user may be able to select objects by touching the user input instrument to the touch screen and dragging the user input instrument along the surface of the screen. In response to this motion, the application program generating the objects can select the objects. Emphasizing an object shall mean emphasizing a display of the object.

Figure 2:
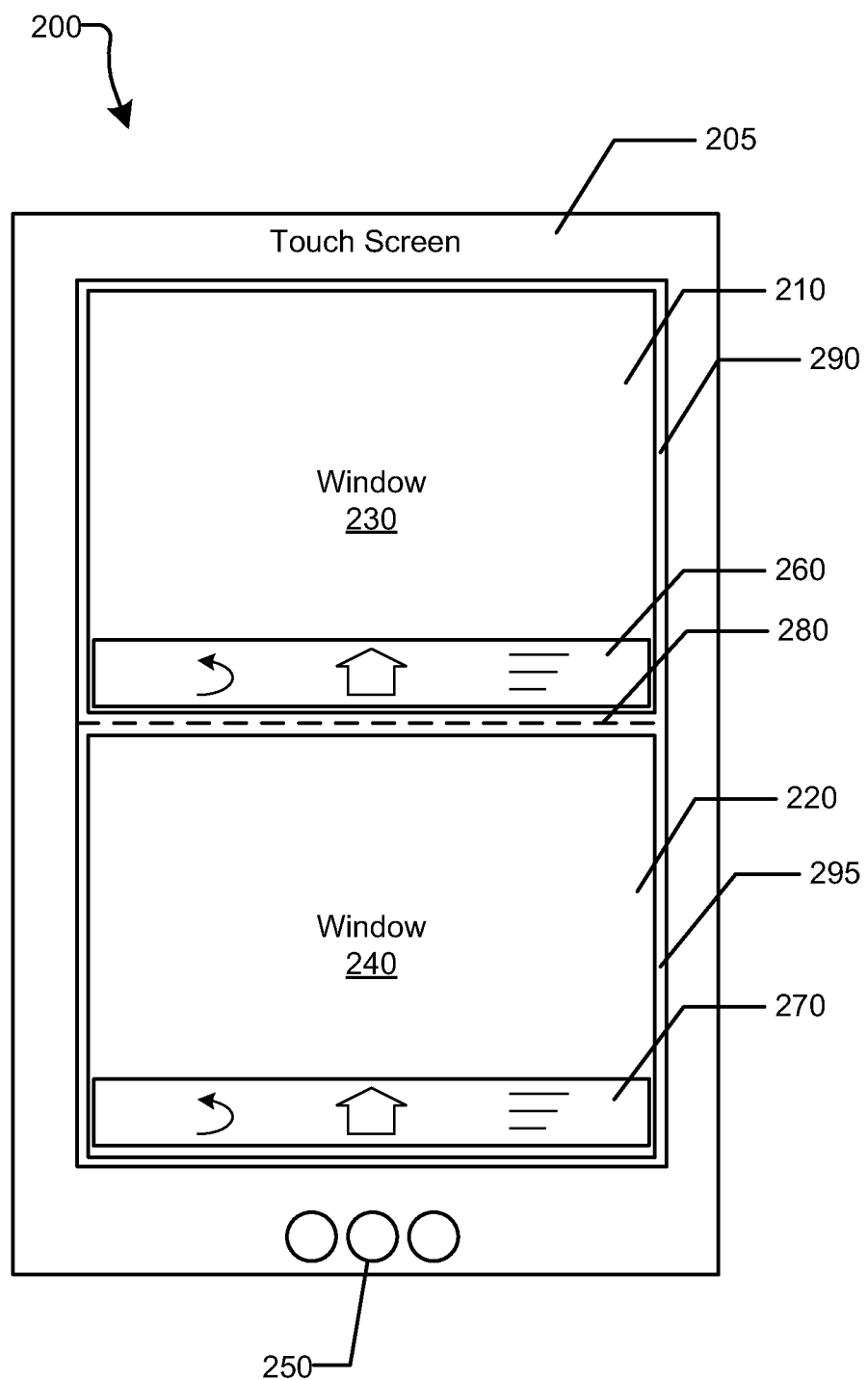
FIG. 2 is an elevation view diagram illustrating a touch screen apparatus 200 in a portrait orientation in a full-size window mode with each of windows 230 and 240 in a landscape orientation according to an embodiment of the present disclosure.

FIG. 2 is an elevation view diagram illustrating a touch screen apparatus 200 in a portrait orientation in a full-size window mode with each of windows 230 and 240 in a landscape orientation according to an embodiment of the present disclosure. Touch screen apparatus 200 includes touch screen housing 205 and display surfaces 290 and 295. Touch screen housing 205 includes controls 250. Display surfaces 290 and 295 include at least one touch screen panel. In an example having two touch screen panels, boundary 280 depicts an edge of each of touch screen panels. The edges depicted by boundary 280 need not be immediately adjacent. For example, touch screen panels can be separated by some distance in the same plane or in different planes, for example, each in a part of a multi-part touch screen housing 205. The relationship between the parts of a multi-part touch screen housing 205 can be fixed or variable. For example, different parts of a multi-part touch screen housing can be rotatable, translatable, or both rotatable and translatable with respect to each other.

Display surfaces 290 and 295 display windows 230 and 240. The displays on windows 230 and 240 can include images produced by application programs such as application programs 188 of FIG. 1. The displays can include the display of objects. A user may be able to interact with the objects by entering input into touch screen 205 using a finger, stylus, pen, or other object to touch the touch screen 205. Controls 250 can control the operation of touch screen 205. In one embodiment, for example, depressing a button can shift touch screen 205 to object recognition mode. In this mode, touch screen 205 can recognize objects when the finger, stylus, pen, or other object is in close proximity to them and can highlight or otherwise emphasize the objects.

In the illustrated embodiment, window 230 includes an application display area 210 and a button bar 260, and window 240 includes an application display area 220 and a button bar 270. Application display area 210 displays an image generated in accordance with instructions of a first application program of application software being executed on touch screen apparatus 200. Application display area 220 displays an image generated in accordance with instructions of a second application program of application software being executed on touch screen apparatus 200. Button bars 260 and 270 provide soft buttons which can be selected by touch screen input. Button bars 260 and 270 include icons displayed over areas for which actuation of touch screen input is recognized as selection of the respective functions depicted by the icons. As an example, if a "home" icon corresponding to a "home" soft button is selected, for example, by touching the icon, a "home" function is performed, reverting the display to a home screen. As another example, if a "menu" icon corresponding to a "menu" soft button is selected, a "menu" function is performed, displaying a menu from which other functions can be selected. As yet another example, if a "back" icon corresponding to a "back" soft button is selected, a "back" function is performed, reverting the display to a previously displayed application state. As illustrated, each window 230 and 240 has its own respective button bar 260 and 270. If, for example, in a single-display display state, window 230 were the only window visible and window 240 were not displayed, only button bar 260 of window 230 would be displayed in window 230.

Touch screens such as touch screen 205 can include resistive touch screens, capacitive touch screens, Digitizer tablets, surface acoustic wave touch screens, infrared grid touch screens, infrared acrylic projection touch screens, optical imaging touch screens, dispersive signal technology touch screens, acoustic pulse recognition touch screens, and other touch screens known to those of skill in the art. Resistive touch screen detect touch or pressure. They can consist of multiple conductive layers. In response to pressure or touch, the layers may touch, creating an electrical connection. Capacitive touch screens can detect a change in electrical conductivity caused by the touch of a finger or other user input instrument. Digitizer tablets, also known as active digitizers, can locate a user input instrument by detecting electrical signals. Some require an active pen, which generates the electrical signals. Others generate an electrical field and may be able to detect the motion of a user input instrument within the electrical field. Some of these tablets may be able to detect the motion of a finger near the touch screen but not touching the touch screen.

An infrared grid recognizes a location of a touch by a disruption to a grid of light emitting diode (LED) beams. It uses an array of infrared LED and photo detector pairs. An infrared acrylic projection touch screen uses infrared cameras to detect distortions in a translucent acrylic sheet. Optical touchscreens use image sensors are placed around the edges of the screen. Infrared back lights are placed in the camera's field of view on the other side of the screen. A touch shows up as a shadow and each pair of cameras can then be pinpointed to locate the touch or even measure the size of the touching object. Dispersive signal technology touch screens use sensors to detect the piezoelectricity in the glass that occurs due to a touch. Algorithms then interpret this information to determine the location of the touch. Acoustic pulse recognition touch screens detect the sound waves produced by touches to determine the location of the touches.

In many embodiments, a touch screen can recognize a finger, stylus, pen, or other user input instrument located near the touch screen but not touching the surface of the touch screen. In this case, the user input instrument is said to be hovering. Hover technologies can include the electrical signal generation of the pen or touch screen described above, the use of cameras, capacitive sensors, and other technologies known to those of skill in the art. A hovering user input instrument can be recognized by the analysis of images captured by one or more cameras from reflections of LED beams projected near the front of a touch screen. Capacitive sensors can combine mutual capacitance and self capacitance to detect a user input instrument hovering above the surface of a touch screen. In some embodiments, a combination of technologies can be used to detect user input instruments hovering over touch screens, such as a combination of image capture and capacitance. A hover-sensing device is a device able to detect a user input instrument hovering above or nearby the surface of a touch screen. In many embodiments, the hover-sensing device is a component of the touch screen.

In some embodiments, touch screen apparatus 200 is able to recognize the position of a user input instrument near the surface of the touch screen and to coordinate the movements of the user input instrument with the display of text or other objects on the touch screen. In some embodiments, capacitive touch input devices can offer the capability of detecting a "hovering" user input instrument, before the instrument actually physically touches the display. In other embodiments, digitizer input devices (accepting input from an active pen) also offer the capability to detect a hovering pen tip, before the pen actually physically touches the display. Other technologies for recognizing a hovering touch screen include signal generation by a touch screen, the use of cameras, and other technologies known to those of skill in the art.

The coordination of the movements of the user input instrument with the display of text or other objects on the touch screen can be achieved by identifying a controller of the words or other objects displayed on the touch screen that are nearby the tip of the user input instrument. A driver of the touch screen can then interact with the text control, translating movements of the pen into commands to the text control to highlight text. In further embodiments, the driver can utilize rich text formatting capabilities of the text control to show the per-word proximity highlights, as calculated based on the individual word's positions in relation to the pen tip. Such standardized display controllers may not be available for modifying the display of other objects, such as objects of a map. In such a case, the driver may have to utilize an application programming interface (API) or other communication method. An API can consist of a set of routines made available by an application such as a mapping application. Other programs can use the routines to request the performance of low-level tasks by the application, such as changing the display of objects generated by the application, by calling upon the routines of the API.

In some embodiments, the process of emphasizing objects near the user input instrument can begin by setting the touch screen display in an object recognition mode. In this mode, when a user input instrument is hovering near the touch screen, the touch screen emphasizes objects on display on the touch screen that are near the user input instrument. The user input instrument can be, for example, an electric pen, a finger, or other pointing instrument known to those of skill in the art for providing user input to a touch screen. In further embodiments, the mode can be set by adjusting a control on the touch screen or on the user input instrument; for example, by depressing a button on an active pen or other electric pen. Thus, when a control is used to set the touch screen to object recognition mode and the user input instrument is a finger, the user can rely on a control on the touch screen itself to set the touch screen to object recognition mode. In other embodiments, the mode can be set without adjusting a control.

In many embodiments, the process of emphasizing objects can be harnessed to simplify the targeting involved in text selection. This dynamic highlight of nearby objects can guide the user in placing the tip of a user input instrument on a desired object. The user can then touch the object on the surface of the touch screen to begin an object selection process with that object. Further, the touching of the tip or other pointing end of the user input instrument to the display surface can end the dynamic emphasis of nearby objects.

In other embodiments, objects other than words can be displayed. In many embodiments, forms of emphasis other than underlining can be used. In general, an emphasis of a word or other object can mark or distinguish a segment of text or other object from other segments of text in a body of text or other objects in a touch screen display. Methods for emphasizing can include highlighting, a segment mark, differentiated font—a larger size font; a different font; fonts with different characteristics, such as bold, italicized, or underlined; drawing a boundary, such as a rectangular boundary, around the portion of text; a blinking background, with black highlights blinking on and off; a display similar to a marquee; a rotating black or red border; a shimmer, in which text moves in and out of focus; and sparkles moving through the text or other objects. Methods for emphasizing text or other objects can also include other uses of graphical elements to point to the portion of text or other objects; and other methods of visually distinguishing a portion of text or other objects that may occur to those of skill in the art. The phrase "object selection assistance" refers to user interface features that assist a user in the selection of objects. The phrase shall include emphasizing objects near a hovering user input instrument.

Figure 3:
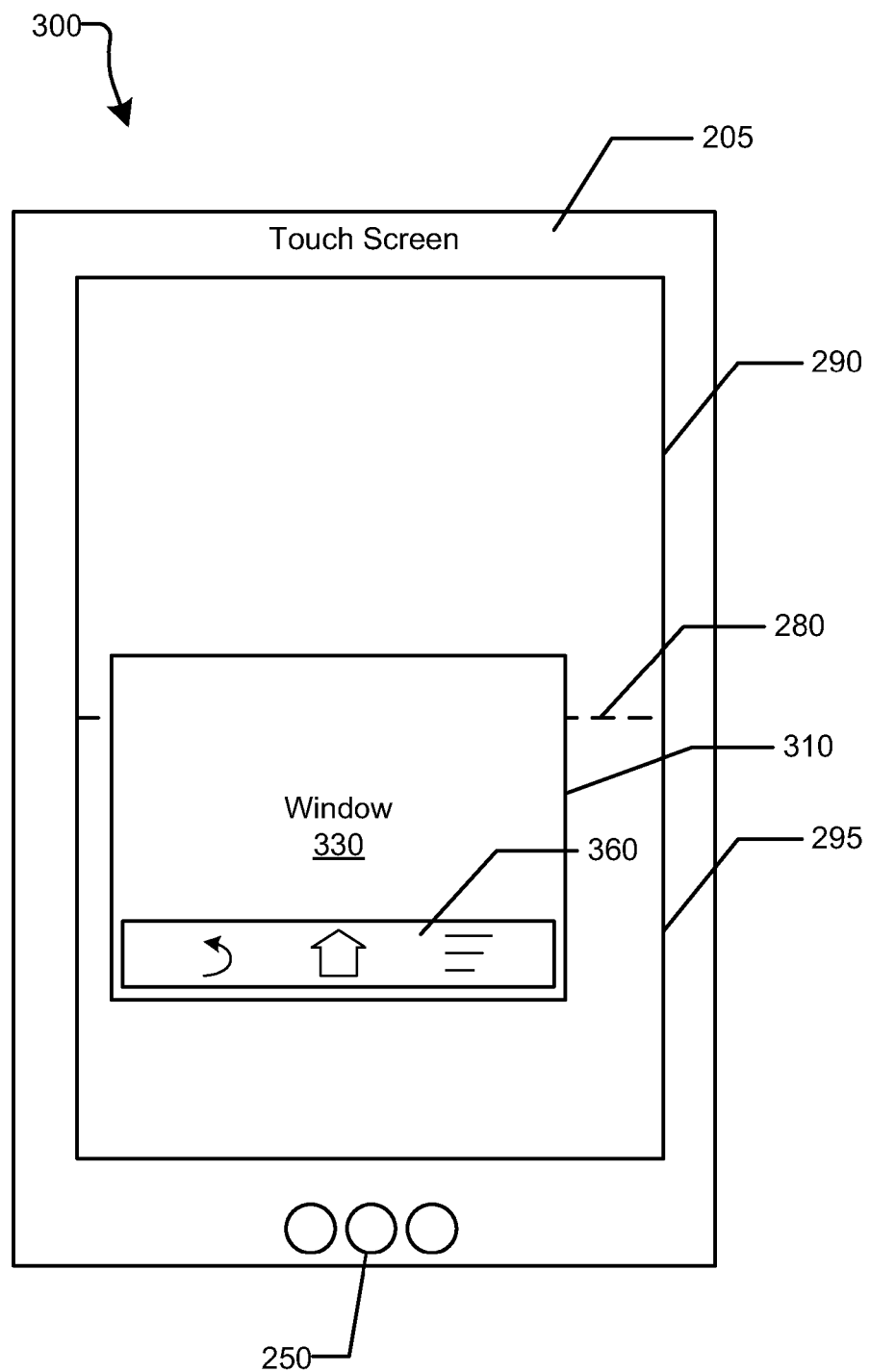
FIG. 3 is an elevation view diagram illustrating a touch screen apparatus 300 in a portrait orientation in a non-full-size window mode with window 330 a landscape orientation according to an embodiment of the present disclosure.

FIG. 3 is an elevation view diagram illustrating a touch screen apparatus 300 in a portrait orientation in a non-full-size window mode with window 330 in a landscape orientation according to an embodiment of the present disclosure. Touch screen apparatus 300 includes touch screen housing 205 and display surfaces 290 and 295. Touch screen housing 205 includes controls 250. Display surfaces 290 and 295 include at least one touch screen panel. In an example having two touch screen panels, boundary 280 depicts an edge of each of touch screen panels. The edges depicted by boundary 280 need not be immediately adjacent. For example, touch screen panels can be separated by some distance in the same plane or in different planes, for example, each in a part of a multi-part touch screen housing 205. The relationship between the parts of a multi-part touch screen housing 205 can be fixed or variable. For example, different parts of a multi-part touch screen housing can be rotatable, translatable, or both rotatable and translatable with respect to each other.

Display surfaces 290 and 295 display window 330, which may occupy, for example, a portion of display surface 290, a portion of display surface 295, or, as shown, a portion spanning both display surface 290 and display surface 295. The displays on window 330 can include images produced by application programs such as application programs 188 of FIG. 1. The displays can include the display of objects. A user may be able to interact with the objects by entering input into touch screen 205 using a finger, stylus, pen, or other object to touch the touch screen 205. Controls 250 can control the operation of touch screen 205. In one embodiment, for example, depressing a button can shift touch screen 205 to object recognition mode. In this mode, touch screen 205 can recognize objects when the finger, stylus, pen, or other object is in close proximity to them and can highlight or otherwise emphasize the objects.

In the illustrated embodiment, window 330 includes an application display area 310 and a button bar 360. Application display area 310 displays an image generated in accordance with instructions of a first application program of application software being executed on touch screen apparatus 300. Button bar 360 provides soft buttons which can be selected by touch screen input. Button bars 360 includes icons displayed over areas for which actuation of touch screen input is recognized as selection of the respective functions depicted by the icons. As an example, if a "home" icon corresponding to a "home" soft button is selected, for example, by touching the icon, a "home" function is performed, reverting the display to a home screen. As another example, if a "menu" icon corresponding to a "menu" soft button is selected, a "menu" function is performed, displaying a menu from which other functions can be selected. As yet another example, if a "back" icon corresponding to a "back" soft button is selected, a "back" function is performed, reverting the display to a previously displayed application state. As illustrated, window 330 has its own button bar 360.

Figure 4:
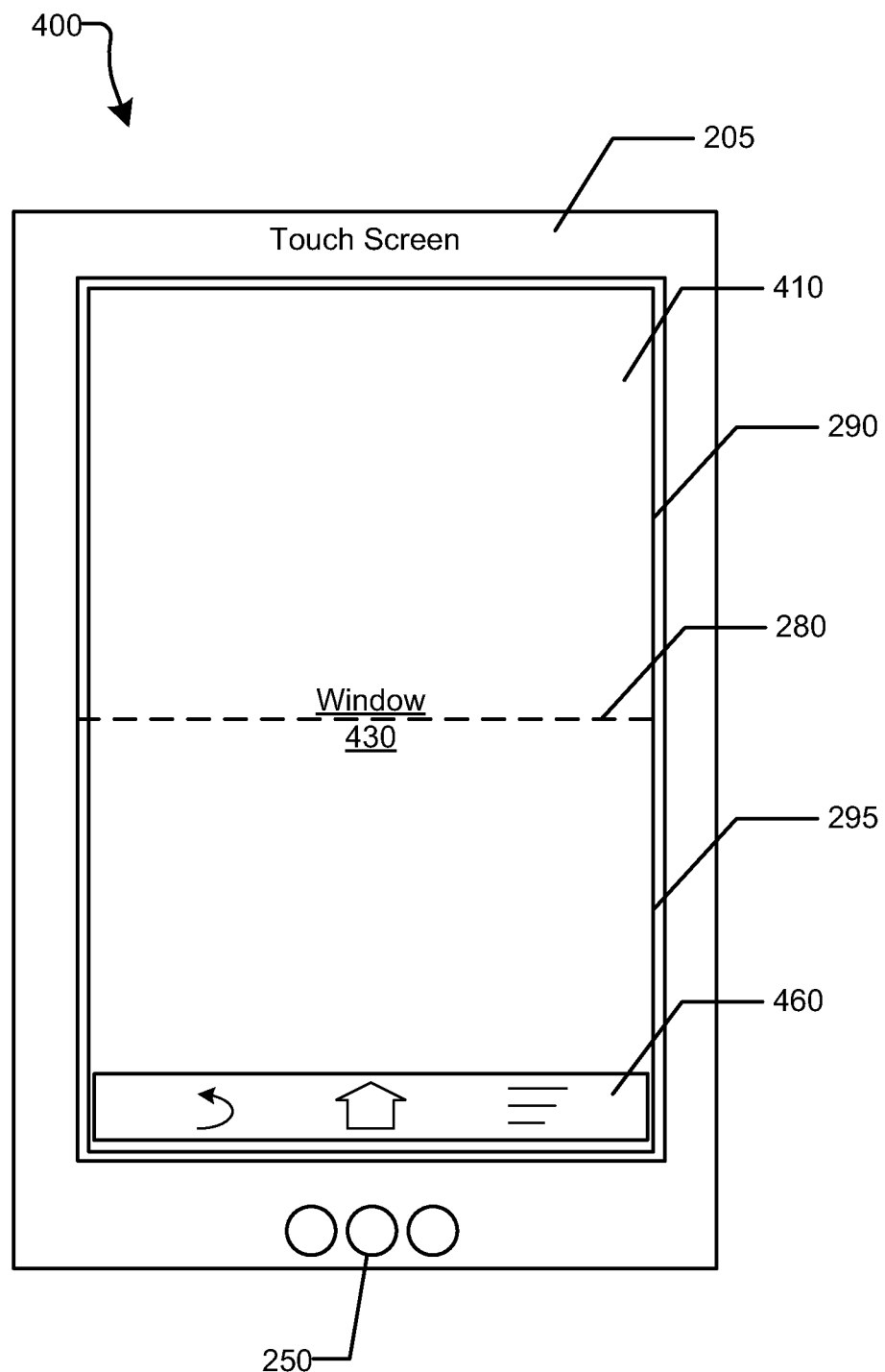
FIG. 4 is an elevation view diagram illustrating a touch screen apparatus 400 in a portrait orientation in a full-screen mode with window 430 in a landscape orientation according to an embodiment of the present disclosure.

FIG. 4 is an elevation view diagram illustrating a touch screen apparatus 400 in a portrait orientation in a full-screen mode with window 430 in a landscape orientation according to an embodiment of the present disclosure. Touch screen apparatus 400 includes touch screen housing 205 and display surfaces 290 and 295. Touch screen housing 205 includes controls 250. Display surfaces 290 and 295 include at least one touch screen panel. In an example having two touch screen panels, boundary 280 depicts an edge of each of touch screen panels. The edges depicted by boundary 280 need not be immediately adjacent. For example, touch screen panels can be separated by some distance in the same plane or in different planes, for example, each in a part of a multi-part touch screen housing 205. The relationship between the parts of a multi-part touch screen housing 205 can be fixed or variable. For example, different parts of a multi-part touch screen housing can be rotatable, translatable, or both rotatable and translatable with respect to each other.

Display surfaces 290 and 295 display window 430, which, in the illustrated example, spans both of display surfaces 290 and 295. The display on window 230 can include images produced by application programs such as application programs 188 of FIG. 1. The displays can include the display of objects. A user may be able to interact with the objects by entering input into touch screen 205 using a finger, stylus, pen, or other object to touch the touch screen 205. Controls 250 can control the operation of touch screen 205. In one embodiment, for example, depressing a button can shift touch screen 205 to object recognition mode. In this mode, touch screen 205 can recognize objects when the finger, stylus, pen, or other object is in close proximity to them and can highlight or otherwise emphasize the objects.

In the illustrated embodiment, window 430 includes an application display area 410 and a button bar 460. Application display area 410 displays an image generated in accordance with instructions of a first application program of application software being executed on touch screen apparatus 400. Button bar 460 provides soft buttons which can be selected by touch screen input. Button bar 460 includes icons displayed over areas for which actuation of touch screen input is recognized as selection of the respective functions depicted by the icons. As an example, if a "home" icon corresponding to a "home" soft button is selected, for example, by touching the icon, a "home" function is performed, reverting the display to a home screen. As another example, if a "menu" icon corresponding to a "menu" soft button is selected, a "menu" function is performed, displaying a menu from which other functions can be selected. As yet another example, if a "back" icon corresponding to a "back" soft button is selected, a "back" function is performed, reverting the display to a previously displayed application state. As illustrated, window 430 has its own button bar 460.

Figure 5:
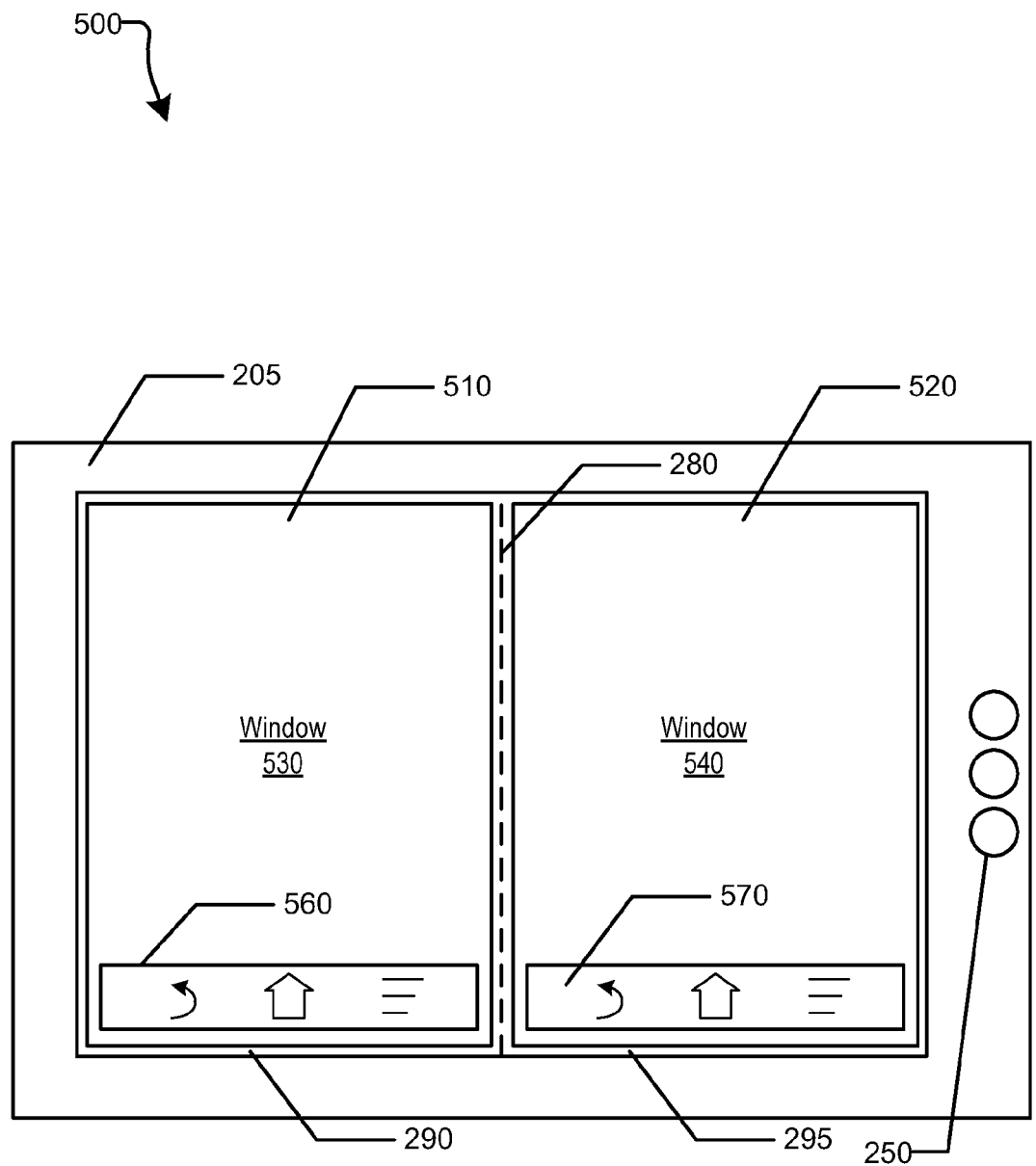
FIG. 5 is an elevation view diagram illustrating a touch screen apparatus 500 in a landscape orientation in a full-size window mode with each of windows 530 and 540 in a portrait orientation according to an embodiment of the present disclosure.

FIG. 5 is an elevation view diagram illustrating a touch screen apparatus 500 in a landscape orientation in a full-size window mode with each of windows 530 and 540 in a portrait orientation according to an embodiment of the present disclosure. Touch screen apparatus 500 includes touch screen housing 205 and display surfaces 290 and 295. Touch screen housing 205 includes controls 250. Display surfaces 290 and 295 include at least one touch screen panel. In an example having two touch screen panels, boundary 280 depicts an edge of each of touch screen panels. The edges depicted by boundary 280 need not be immediately adjacent. For example, touch screen panels can be separated by some distance in the same plane or in different planes, for example, each in a part of a multi-part touch screen housing 205. The relationship between the parts of a multi-part touch screen housing 205 can be fixed or variable. For example, different parts of a multi-part touch screen housing can be rotatable, translatable, or both rotatable and translatable with respect to each other.

Display surfaces 290 and 295 display windows 530 and 540. The displays on windows 530 and 540 can include images produced by application programs such as application programs 188 of FIG. 1. The displays can include the display of objects. A user may be able to interact with the objects by entering input into touch screen 205 using a finger, stylus, pen, or other object to touch the touch screen 205. Controls 250 can control the operation of touch screen 205. In one embodiment, for example, depressing a button can shift touch screen 205 to object recognition mode. In this mode, touch screen 205 can recognize objects when the finger, stylus, pen, or other object is in close proximity to them and can highlight or otherwise emphasize the objects.

In the illustrated embodiment, window 530 includes an application display area 510 and a button bar 560, and window 540 includes an application display area 520 and a button bar 570. Application display area 510 displays an image generated in accordance with instructions of a first application program of application software being executed on touch screen apparatus 500. Application display area 520 displays an image generated in accordance with instructions of a second application program of application software being executed on touch screen apparatus 500. Button bars 560 provide soft buttons which can be selected by touch screen input. Button bars 560 include icons displayed over areas for which actuation of touch screen input is recognized as selection of the respective functions depicted by the icons. As an example, if a "home" icon corresponding to a "home" soft button is selected, for example, by touching the icon, a "home" function is performed, reverting the display to a home screen. As another example, if a "menu" icon corresponding to a "menu" soft button is selected, a "menu" function is performed, displaying a menu from which other functions can be selected. As yet another example, if a "back" icon corresponding to a "back" soft button is selected, a "back" function is performed, reverting the display to a previously displayed application state. As illustrated, each window 530 and 540 has its own respective button bar 560 and 570. If, for example, in a single-display display state, window 530 were the only window visible and window 540 were not displayed, only button bar 560 of window 530 would be displayed in window 530.

Figure 6:
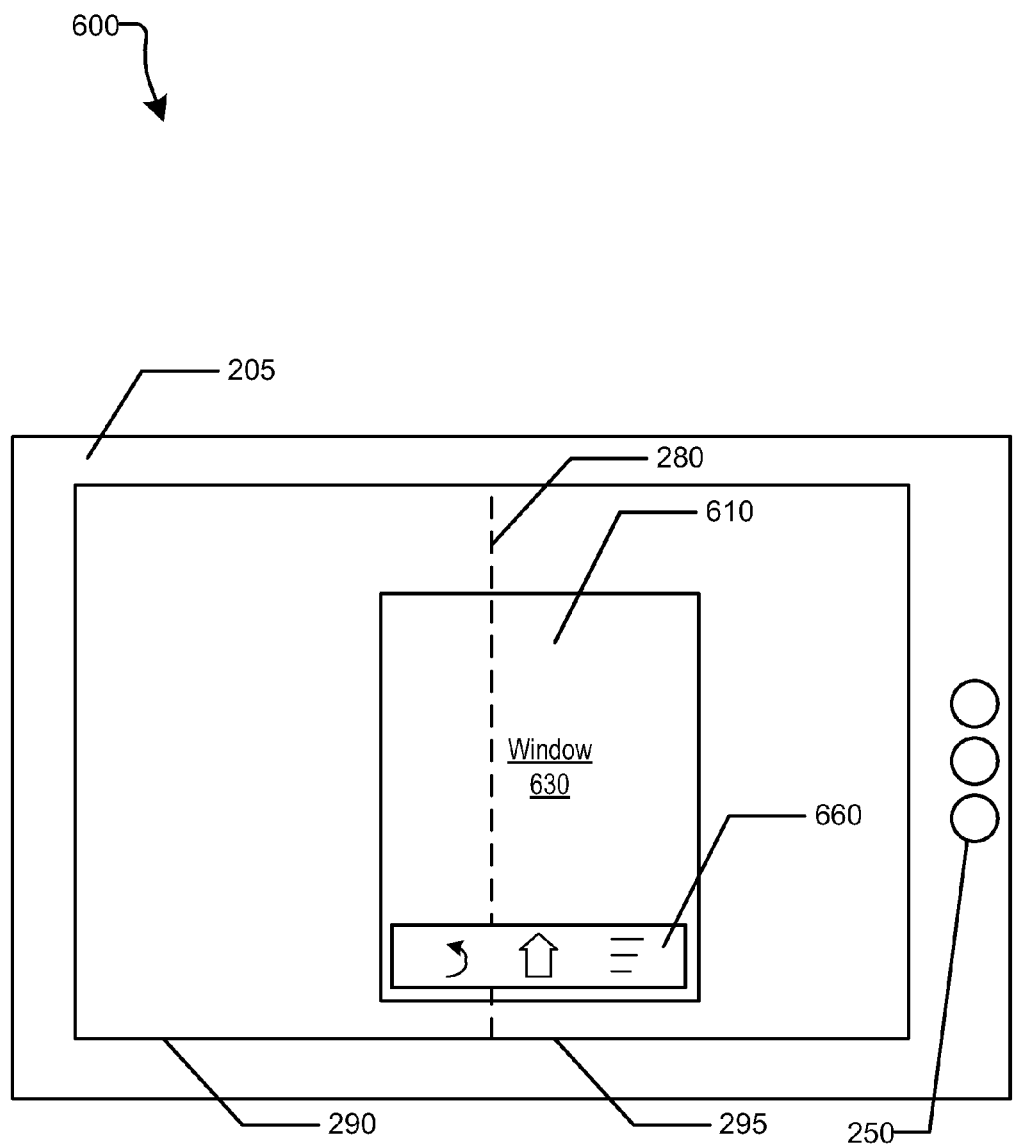
FIG. 6 is an elevation view diagram illustrating a touch screen apparatus 600 in a landscape orientation in a non-full-size window mode with window 630 in a portrait orientation according to an embodiment of the disclosure.

FIG. 6 is an elevation view diagram illustrating a touch screen apparatus 600 in a landscape orientation in a non-full-size window mode with window 630 in a portrait orientation according to an embodiment of the disclosure. Touch screen apparatus 600 includes touch screen housing 205 and display surfaces 290 and 295. Touch screen housing 205 includes controls 250. Display surfaces 290 and 295 include at least one touch screen panel. In an example having two touch screen panels, boundary 280 depicts an edge of each of touch screen panels. The edges depicted by boundary 280 need not be immediately adjacent. For example, touch screen panels can be separated by some distance in the same plane or in different planes, for example, each in a part of a multi-part touch screen housing 205. The relationship between the parts of a multi-part touch screen housing 205 can be fixed or variable. For example, different parts of a multi-part touch screen housing can be rotatable, translatable, or both rotatable and translatable with respect to each other.

Display surfaces 290 and 295 display window 630, which may occupy, for example, a portion of display surface 290, a portion of display surface 295, or, as shown, a portion spanning both display surface 290 and display surface 295. The displays on window 630 can include images produced by application programs such as application programs 188 of FIG. 1. The displays can include the display of objects. A user may be able to interact with the objects by entering input into touch screen 205 using a finger, stylus, pen, or other object to touch the touch screen 205. Controls 250 can control the operation of touch screen 205. In one embodiment, for example, depressing a button can shift touch screen 205 to object recognition mode. In this mode, touch screen 205 can recognize objects when the finger, stylus, pen, or other object is in close proximity to them and can highlight or otherwise emphasize the objects.

In the illustrated embodiment, window 630 includes an application display area 610 and a button bar 660. Application display area 610 displays an image generated in accordance with instructions of a first application program of application software being executed on touch screen apparatus 600. Button bar 660 provides soft buttons which can be selected by touch screen input. Button bars 660 includes icons displayed over areas for which actuation of touch screen input is recognized as selection of the respective functions depicted by the icons. As an example, if a "home" icon corresponding to a "home" soft button is selected, for example, by touching the icon, a "home" function is performed, reverting the display to a home screen. As another example, if a "menu" icon corresponding to a "menu" soft button is selected, a "menu" function is performed, displaying a menu from which other functions can be selected. As yet another example, if a "back" icon corresponding to a "back" soft button is selected, a "back" function is performed, reverting the display to a previously displayed application state. As illustrated, window 630 has its own button bar 660.

Figure 7:
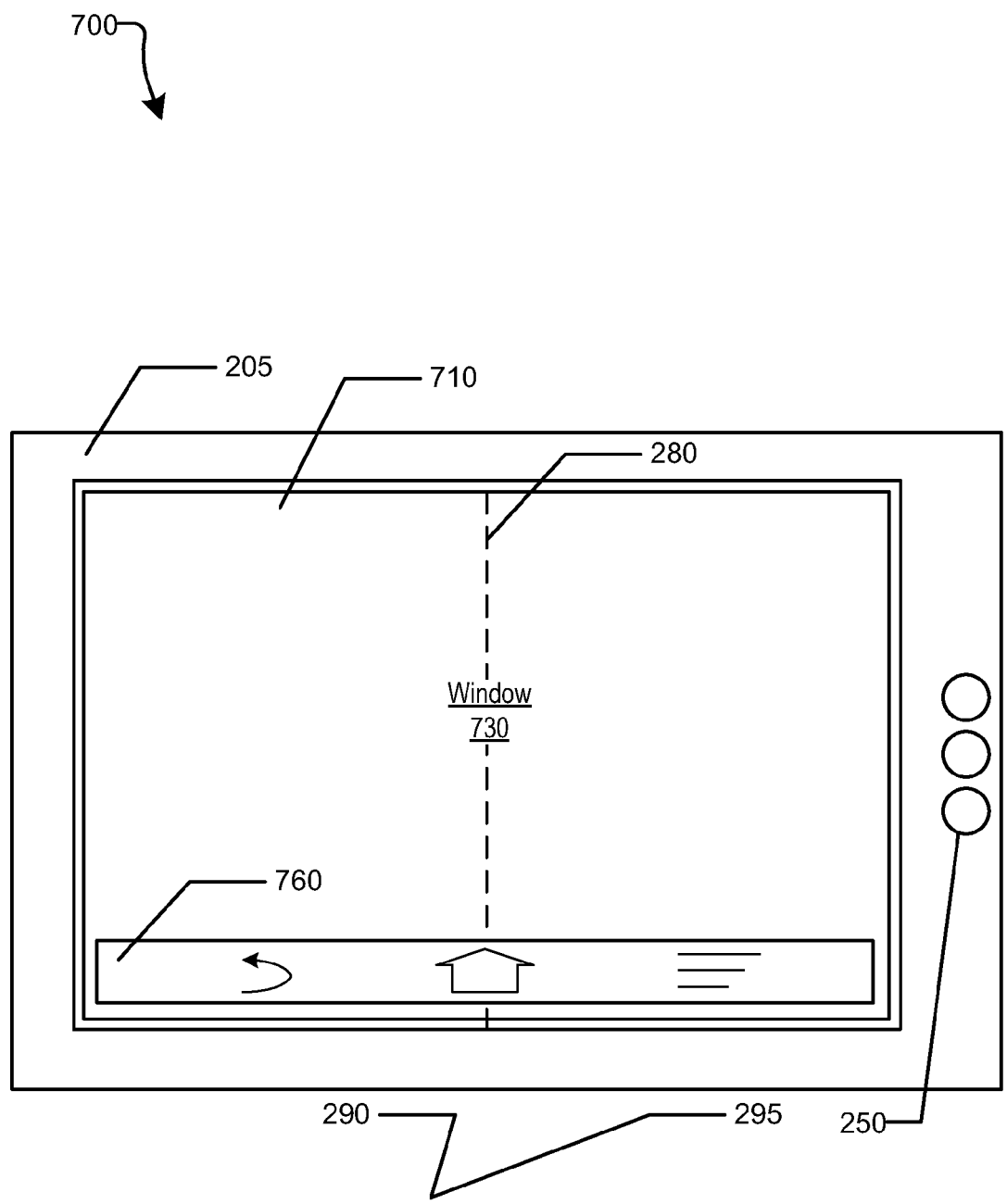
FIG. 7 is an elevation view diagram illustrating a touch screen apparatus 700 in a landscape orientation in a full-screen mode with window 730 in a landscape orientation according to an embodiment of the disclosure.

FIG. 7 is an elevation view diagram illustrating a touch screen apparatus 700 in a landscape orientation in a full-screen mode with window 730 in a landscape orientation according to an embodiment of the disclosure. Touch screen housing 205 includes controls 250. Display surfaces 290 and 295 include at least one touch screen panel. In an example having two touch screen panels, boundary 280 depicts an edge of each of touch screen panels. The edges depicted by boundary 280 need not be immediately adjacent. For example, touch screen panels can be separated by some distance in the same plane or in different planes, for example, each in a part of a multi-part touch screen housing 205. The relationship between the parts of a multi-part touch screen housing 205 can be fixed or variable. For example, different parts of a multi-part touch screen housing can be rotatable, translatable, or both rotatable and translatable with respect to each other.

Display surfaces 290 and 295 display window 730, which, in the illustrated example, spans both of display surfaces 290 and 295. The display on window 730 can include images produced by application programs such as application programs 188 of FIG. 1. The displays can include the display of objects. A user may be able to interact with the objects by entering input into touch screen 205 using a finger, stylus, pen, or other object to touch the touch screen 205. Controls 250 can control the operation of touch screen 205. In one embodiment, for example, depressing a button can shift touch screen 205 to object recognition mode. In this mode, touch screen 205 can recognize objects when the finger, stylus, pen, or other object is in close proximity to them and can highlight or otherwise emphasize the objects.

In the illustrated embodiment, window 730 includes an application display area 710 and a button bar 760. Application display area 710 displays an image generated in accordance with instructions of a first application program of application software being executed on touch screen apparatus 700. Button bar 760 provides soft buttons which can be selected by touch screen input. Button bar 760 includes icons displayed over areas for which actuation of touch screen input is recognized as selection of the respective functions depicted by the icons. As an example, if a "home" icon corresponding to a "home" soft button is selected, for example, by touching the icon, a "home" function is performed, reverting the display to a home screen. As another example, if a "menu" icon corresponding to a "menu" soft button is selected, a "menu" function is performed, displaying a menu from which other functions can be selected. As yet another example, if a "back" icon corresponding to a "back" soft button is selected, a "back" function is performed, reverting the display to a previously displayed application state. As illustrated, window 730 has its own button bar 760.

Figure 8:
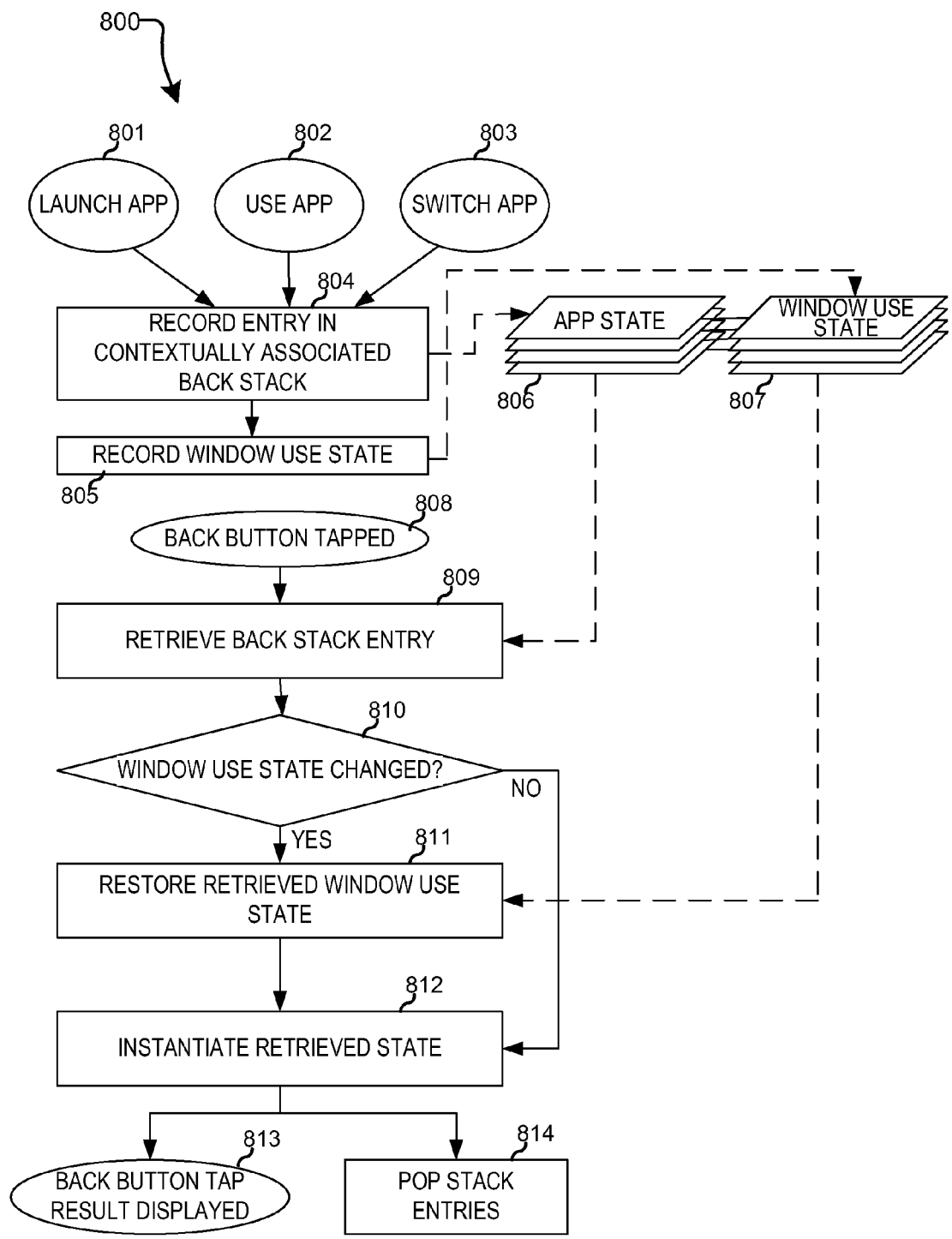
FIG. 8 is a flow diagram illustrating a method 800 for managing a back stack behavior in a touch screen apparatus according to an embodiment of the disclosure.

FIG. 8 is a flow diagram illustrating a method 800 for managing a back stack behavior in a touch screen apparatus according to an embodiment of the disclosure. As shown, method 800 may be initiated by launching an application program in block 801, by using an application program in block 802, or by switching application programs in block 803. Upon initiation in any of blocks 801, 802, or 803, block 804 is performed. In block 804, an entry for the application state 806 is recorded in a contextually associated back stack. From block 804, the method continues to block 805. In block 805, a window use state 807 is recorded.

The stack is a last-in-first-out (LIFO) data structure for storing entries descriptive of a state of an information handling system. A stack is typically illustrated as beginning at a "bottom" of the stack and having successive entries added on "top" of each preceding entry, such that a "top" of the stack is where the last entry added to the stack, which is intended to be the first entry to be removed from the stack unless another entry is subsequently added to the stack before the entry is removed from the stack. When entries are added to a stack, they are said to be pushed onto the stack. When entries are removed from a stack, they are said to be popped off the stack. The addition and removal of entries to and from a stack can be accomplished by writing and erasing, respectively, the entries from a memory in which the stack is stored, or, for example, by writing an entry to memory and adjusting a stack pointer to have a value of a new stack address based on the addition of the entry, in the case of adding an entry, and by simply adjusting the stack pointer back to a previous stack address to effect removal of an entry. A stack can comprise application state information descriptive of an application state of a software application. A back stack is a stack which allows reversion to a previous application state of a software application, for example, based on detection of actuation of a back button displayed to a user.

In one embodiment, a back stack may be implemented as a single LIFO data structure having entries that each store application state information and display use state information. In another embodiment, a back stack may implemented as a first LIFO data structure having entries that each store application state information and a second LIFO data structure having entries that each store display use state information, wherein the pushing and popping of entries to and from the first and second LIFO data structures is coordinated so as to make the multiple LIFO data structures function equivalently to a single LIFO data structure. Thus, a LIFO data structure comprising application state information and display state information is understood to include either a single LIFO data structure comprising such information or multiple LIFO data structures comprising such information distributed among the multiple LIFO data structures.

When a back button is tapped, the method detects the back button actuation in block 808. From block 808, the method continues to block 809. In block 809, the stored application state 806 of the back stack entry recorded in step 804 is retrieved. From block 809, the method continues to decision block 810. In decision block 810, a decision is made as to whether or not the window use state has changed. If the window use state has not changed, the method continues to block 812. If the window use state has changed, the method continues to block 811. In block 811, the retrieved window use state is restored. From block 811, the method continues to block 812. In block 812, the retrieved state is instantiated. From block 812, the back button tap result is displayed in block 813, and the stack entries are popped in block 814.

Some embodiments of touch screen apparatus can be physically reconfigured to have different modes of display operation by changing the physical relationships of touch screen panels relative to one another. For example, a touch screen apparatus may include multiple touch screen housings. One touch screen housing may be rotatable or translatable with respect to another touch screen housing. For example, one touch screen housing may be foldable, slidable, pivotable, or otherwise reconfigurable relative to another touch screen housing. One or more of such features may be included in a touch screen apparatus. The touch screen apparatus can detect if a change to its physical orientation has occurred. One example of a physical orientation of a multi-display touch screen apparatus is a tablet orientation, where multiple displays lie in the same plane adjacent to one another. For example, a hinged connection between displays can be open 180 degrees. Another example of a physical orientation is a laptop or clamshell orientation, in a landscape display mode, where a hinged connection is opened more than 90 but less than 180 degrees. In a portrait display mode, such an orientation is referred to as a book orientation. If the hinged connection is opened to 360 degrees, such that the displays face opposite directions, such an orientation is referred to as a 360 orientation. Another example of a physical orientation is a media or tent orientation, where a hinged connection is open more than 180 but less than 360 degrees. Upon detection of physical reconfiguration, the touch screen apparatus can truncate one or more of the back stacks it maintains. Such truncation need not apply only to the top of the back stack. Rather, the back stack may be truncated at a depth of the back stack based on display use state information pertaining to application state information stored at that depth. Such depth may be determined by comparing the display use state information in a regressive manner until display use state information is found to be incompatible with a new physical configuration of the touch screen apparatus. For example, if a touch screen apparatus has two touch screen panels which are foldable relative to each other and the touch screen apparatus is folded from displaying both touch screen panels to a new configuration where only one touch screen panel is visible, stored display use state information from a previous display use state that, if reverted to, would utilize the touch screen panel which is no longer visible can serve as a basis for truncating the back stack at the depth at which such display use state information is stored. Truncation may be performed, for example, by resetting a back stack pointer to the bottom of its back stack. The back stack pointer may be immediately reset to the bottom of its back stack, or, for example, they back stack may be configured to reset its back stack pointer to the bottom of the back stack when the back stack reaches the depth described above. Truncation of a back stack can prevent actuation of a back button from placing a touch screen apparatus in a display mode incompatible with its current display configuration. Truncation may be performed on one or more back stacks associated with one or more back buttons. For example, truncation may be performed on a back stack corresponding to a back button on a navigation bar in a display window displayed on a touch screen panel which is no longer accessible to a user after physical reconfiguration of the touch screen apparatus.

Figure 9:
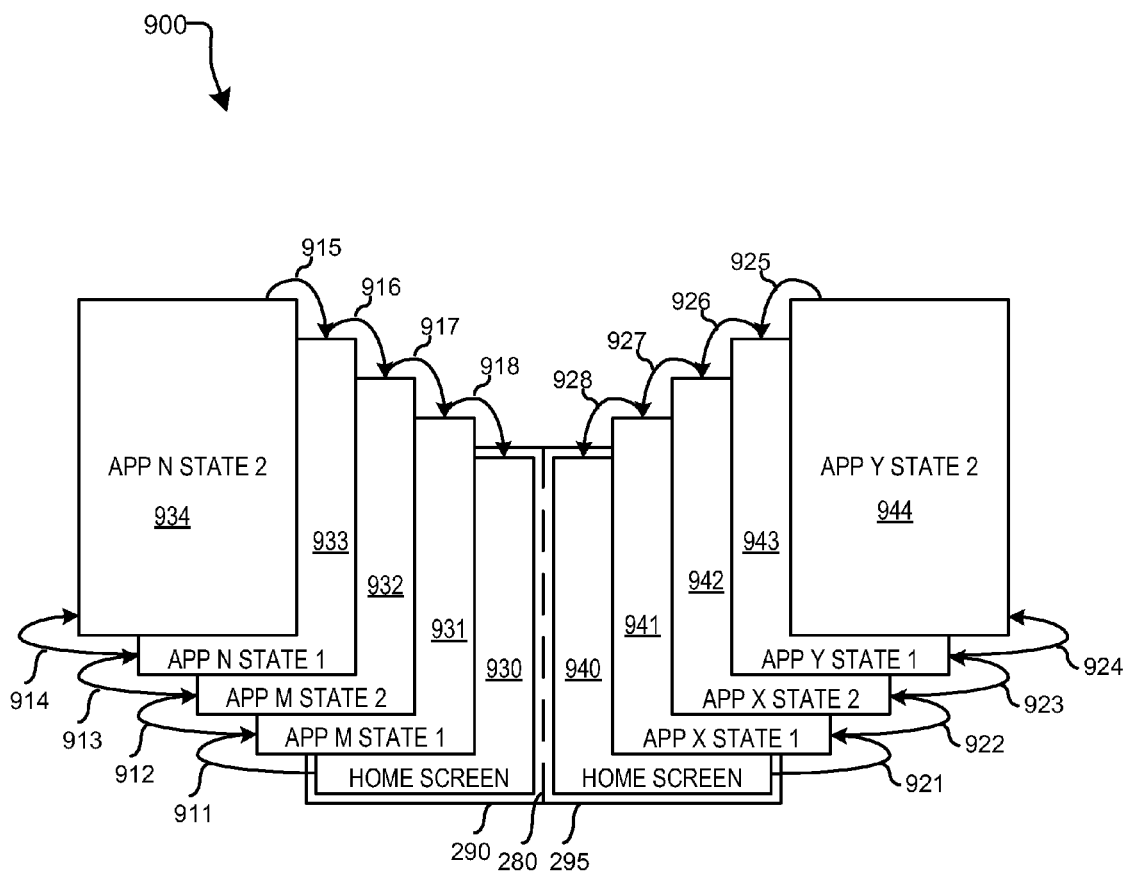
FIG. 9 is a block diagram illustrating a progression of application states of software applications in a window mode of a touch screen apparatus 900 according to an embodiment of the disclosure.

FIG. 9 is a block diagram illustrating a progression of application states of software applications in a window mode of a touch screen apparatus 900 according to an embodiment of the disclosure. Touch screen apparatus 900 includes display surfaces 290 and 295. Display surfaces 290 and 295 include at least one touch screen panel. In an example having two touch screen panels, boundary 280 depicts an edge of each of touch screen panels. In an example having a single touch screen panel, boundary 280 can be located at the middle of the single touch screen panel, with each of display surfaces 290 and 295 being respective halves of the single touch screen panel.

Initially, a home screen window image 930 is displayed on display surface 290, and a home screen window image 940 is displayed on display surface 295. When an application M is initialized, the image displayed on display surface 290 changes to application M state 1 window image 931 via transition 911. When application M changes from application M state 1 to application M state 2, the image displayed on the display surface 290 changes to application M state 2 window image 932 via transition 912. When an application N is initialized, the image displayed on display surface 290 changes to application N state 1 window image 933 via transition 913. When application N changes from application N state 1 to application N state 2, the image displayed on the display surface 290 changes to application N state 2 window image 934 via transition 914.

When application N reverts from application N state 2 to application N state 1, for example, in response to detecting a back button being tapped, the image displayed on the display surface 290 changes from application N state 2 window image 934 to application N state 1 window image 933 via transition 915. When, for example, another instance of tapping the back button is detected, the image displayed on the display surface 290 changes from application N state 1 window image 933 back to application M state 2 window image 932 via transition 916. When application M state 2 reverts to application M state 1, the image displayed on the display surface 290 changes from application M state 2 window image 932 to application M state 1 window image 931 via transition 917. When, for example, another instance of tapping the back button is detected, the image displayed on the display surface 290 changes from application M state 1 window image 931 back to home screen window image 930 via transition 918.

Referring now to display surface 295, when an application X is initialized, the image displayed on display surface 295 changes from home screen window image 940 to application X state 1 window image 941 via transition 921. When application X changes from application X state 1 to application X state 2, the image displayed on the display surface 295 changes to application X state 2 window image 942 via transition 922. When an application Y is initialized, the image displayed on display surface 295 changes to application Y state 1 window image 943 via transition 923. When application Y changes from application Y state 1 to application Y state 2, the image displayed on the display surface 295 changes to application Y state 2 window image 944 via transition 924.

When application Y reverts from application Y state 2 to application Y state 1, for example, in response to detecting a back button being tapped, the image displayed on the display surface 295 changes from application Y state 2 window image 944 to application Y state 1 window image 943 via transition 925. When, for example, another instance of tapping the back button is detected, the image displayed on the display surface 295 changes from application Y state 1 window image 943 back to application X state 2 window image 942 via transition 926. When application X state 2 reverts to application X state 1, the image displayed on the display surface 295 changes from application X state 2 window image 942 to application X state 1 window image 941 via transition 927. When, for example, another instance of tapping the back button is detected, the image displayed on the display surface 295 changes from application X state 1 window image 941 back to home screen window image 940 via transition 928.

Figure 10:
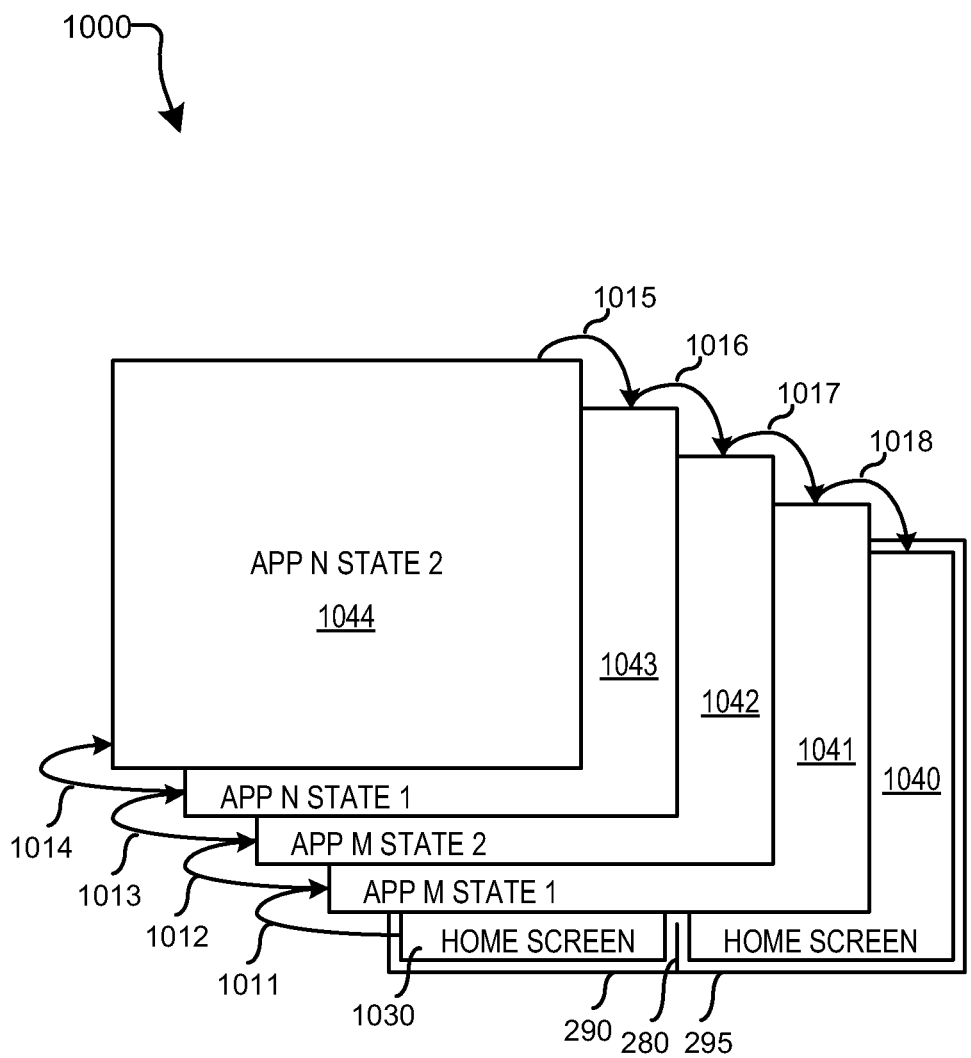
FIG. 10 is a block diagram illustrating a progression of application states of software applications in a full-screen mode of a touch screen apparatus 1000 according to an embodiment of the disclosure.

FIG. 10 is a block diagram illustrating a progression of application states of software applications in a full-screen mode of a touch screen apparatus 1000 according to an embodiment of the disclosure. Touch screen apparatus 1000 includes display surfaces 290 and 295. Display surfaces 290 and 295 include at least one touch screen panel. In an example having two touch screen panels, boundary 280 depicts an edge of each of touch screen panels. In an example having a single touch screen panel, boundary 280 can be located at the middle of the single touch screen panel, with each of display surfaces 290 and 295 being respective halves of the single touch screen panel.

Initially, a home screen window image 1030 is displayed on display surface 290, and a home screen window image 1040 is displayed on display surface 295. When an application M is initialized, the images displayed on display surfaces 290 and 295 change to application M state 1 window image 1041 via transition 1011. Whereas home screen window images 1030 and 1040 are displayed on display surfaces 290 and 295, respectively, application M state 1 window image 1041 spans both of display surfaces 290 and 295 in the full-screen mode of FIG. 10. When application M changes from application M state 1 to application M state 2, the image displayed on the display surfaces 290 and 295 changes to application M state 2 window image 1042 via transition 1012. When an application N is initialized, the image displayed on display surfaces 290 and 295 changes to application N state 1 window image 1043 via transition 1013. When application N changes from application N state 1 to application N state 2, the image displayed on the display surfaces 290 and 295 changes to application N state 2 window image 1044 via transition 1014.

When application N reverts from application N state 2 to application N state 1, for example, in response to detecting a back button being tapped, the image displayed on the display surface 290 changes from application N state 2 window image 1044 to application N state 1 window image 1043 via transition 1015. When, for example, another instance of tapping the back button is detected, the image displayed on the display surfaces 290 and 295 changes from application N state 1 window image 1043 back to application M state 2 window image 1042 via transition 1016. When application M state 2 reverts to application M state 1, the image displayed on the display surfaces 290 and 295 changes from application M state 2 window image 1042 to application M state 1 window image 1041 via transition 1017. When, for example, another instance of tapping the back button is detected, the image displayed on the display surfaces 290 and 295 changes from application M state 1 window image 1041 back to home screen window image 1040 via transition 1018.

Figure 11:
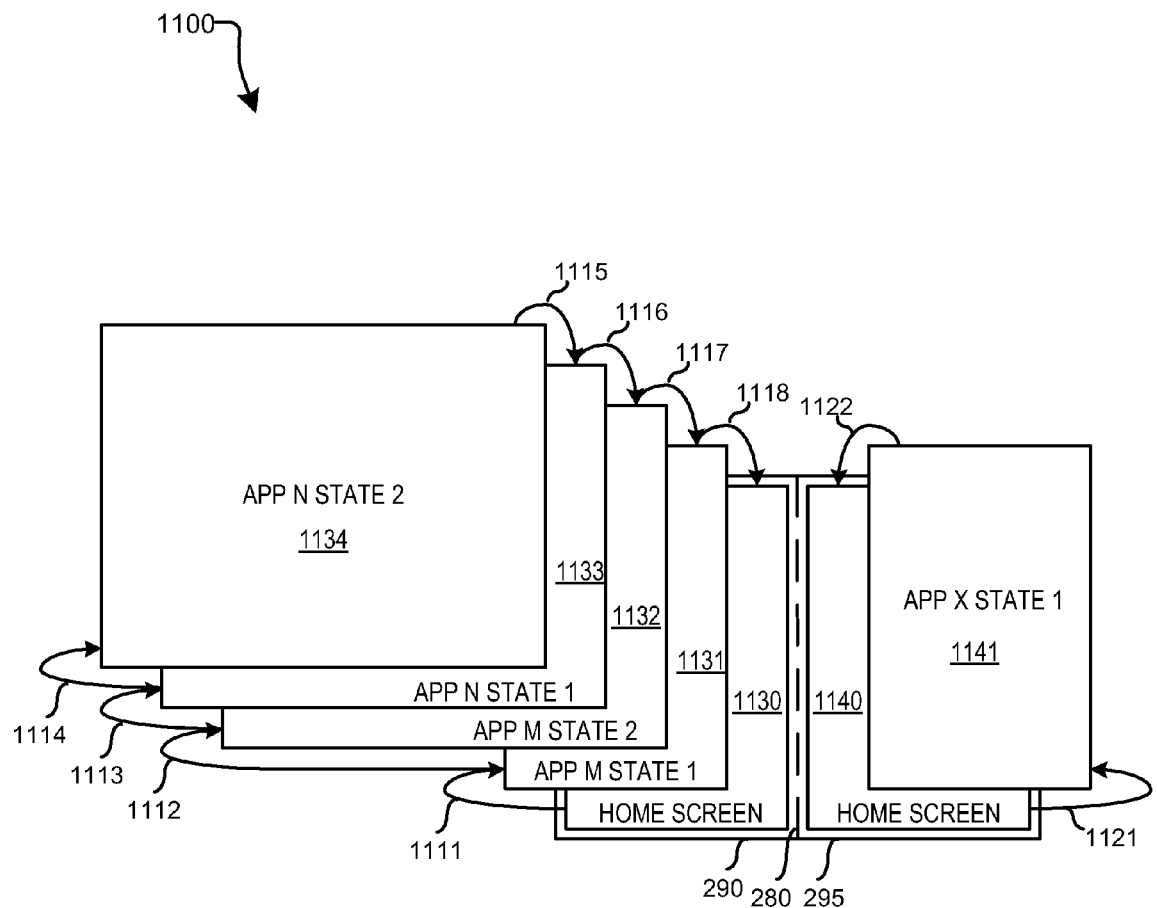
FIG. 11 is a block diagram illustrating a progression of application states of software applications including both a window mode and a full-screen mode of a touch screen apparatus 1100 according to an embodiment of the disclosure.

FIG. 11 is a block diagram illustrating a progression of application states of software applications including both a window mode and a full-screen mode of a touch screen apparatus 1100 according to an embodiment of the disclosure. Touch screen apparatus 1100 includes display surfaces 290 and 295. Display surfaces 290 and 295 include at least one touch screen panel. In an example having two touch screen panels, boundary 280 depicts an edge of each of touch screen panels. In an example having a single touch screen panel, boundary 280 can be located at the middle of the single touch screen panel, with each of display surfaces 290 and 295 being respective halves of the single touch screen panel.

Initially, a home screen window image 1130 is displayed on display surface 290, and a home screen window image 1140 is displayed on display surface 295. When an application M is initialized, the image displayed on display surface 290 changes to application M state 1 window image 1131 via transition 1111. When an application X is initialized, the image displayed on display surface 295 changes from home screen window image 1140 to application X state 1 window image 1141 via transition 1121. When an input is received to toggle the window use state from a full-size window mode to a full-screen mode, application M changes from application M state 1 to application M state 2, and the images displayed on the display surfaces 290 and 295 change to full-screen application M state 2 window image 1132 via transition 1112. When an application N is initialized, the image displayed on display surfaces 290 and 295 changes to application N state 1 window image 1133 via transition 1113. When application N changes from application N state 1 to application N state 2, the image displayed on the display surfaces 290 and 295 changes to application N state 2 window image 1134 via transition 1114.

When application N reverts from application N state 2 to application N state 1, for example, in response to detecting a back button being tapped, the image displayed on the display surfaces 290 and 295 changes from application N state 2 window image 1134 to application N state 1 window image 1133 via transition 1115. When, for example, another instance of tapping the back button is detected, the image displayed on the display surfaces 290 and 295 changes from application N state 1 window image 1133 back to application M state 2 window image 1132 via transition 1116. When application M state 2 reverts to application M state 1, the image displayed on the display surface 290 changes from half of full-screen application M state 2 window image 1132 to application M state 1 window image 1131 via transition 1117, and the image displayed on display surface 295 changes from the other half of full-screen application M state 2 window image 1132 to application X state 1 window image 1141. When, for example, another instance of tapping the back button is detected for application M state 1 window image 1131, the image displayed on the display surface 290 changes from application M state 1 window image 1131 back to home screen window image 1130 via transition 1118. When, for example, another instance of tapping the back button is detected for application X state 1 window image 1141, the image displayed on the display surface 295 changes from application X state 1 window image 1141 back to home screen window image 1140 via transition 1122.

A system and method for a back stack in a multi-application environment is provided. The back stack can support and be responsive to a back button. The back stack can provide an ability to manage application state and display state information in a touch screen apparatus, for example, a touch screen apparatus comprising two display surfaces.

Typically, a back stack provides a set of functionality that determines what content a user sees when tapping the back button. On a touch screen apparatus having two display surfaces, the apparatus may be displaying two application window images of two different application program at some times, but at a single application window image of a single application program at other times. The application programs can occupy different display surfaces at different times, based on selections received from a user, for example, via a touch screen.

In accordance with one embodiment, contextual back buttons are provided on contextual navigation bars. Each application program window is provided with its own back button (as opposed to, for example, always using only a single back button that refers to a notion of a single foreground application program). For example, a dual-screen display displaying a first application's window image on a first display screen and a second application's window image on a second display screen provides a separate back button for each of the display screens. The touch screen apparatus responds to changes in at least one application state of at least one application program, records application states of the current application program in the back stack, and records changes of the current application program that appear as a consequence of launching or switching to another application program in the context. The back button, and its associated back stack, travel with the application program, if the application program switches displays, as a navigation bar dedicated to the application program continues to be displayed with the application program window for that application program even if the mode in which that application program window is displayed changes, provided the application program window remains visible. The desired user experience is achieved by providing each application program with its own navigation bar. Each of the navigation bars hosts a back button, along with a home button and a recents button.

On a dual-display device, each navigation bar is positioned as described below. When the touch screen apparatus is in a landscape orientation, with an application program window per display surface (e.g., in a full-size window display mode), two navigation bars are displayed, one each along the bottom of each display surface (e.g., so the navigation bar on the primary display is near a device hinge). When the touch screen apparatus is in a landscape orientation, with a single application program window across both display surfaces (e.g., in a full-screen display mode), one navigation bar is displayed along the bottom of the window being displayed. When the touch screen apparatus is in a portrait orientation, with an application program window per display surface, two navigation bars are displayed, each one along the bottom of each window being displayed (e.g., resulting in two short bars next to each other). When the touch screen apparatus is in a portrait orientation, with a single application program window across both display surfaces, one navigation bar is displayed, spanning the bottom of both display surfaces.

In accordance with one embodiment, contextual back stack mechanics are implemented as described below. As applications are initialized and used, entries are made in the back stack to record the sequence of use. Each back stack entry is enriched with display use state information. Display use state information captures whether the application program associated with the back stack is running in dual display mode or in single display mode, and on which display surface. This display use state information is then used when the back button is tapped, updating the display use to reconstruct the state associated with the given back stack entry.

In accordance with one embodiment, side-by-side use of multiple application programs, each having its own dedicated display surface, is enabled. Automated transition between multiple application states and display use states is provided in a manner that supports touch screen apparatus with new form factors, such as those having multiple display surfaces (e.g., laptop computers with external display connectors and tablets having multiple touch screen panels), and form factors with a single display large enough to display two application program window images side-by-side (e.g., all-in-one computing devices, high resolution tablets, etc.).

Tapping an application program window's back button shows the content that was previously shown (based on a previous application state of the application program) in the context of the current display. With two single-display application programs running side by side, two back stacks are accessible for the user, each one associated with each application program and each one having a corresponding navigation bar with a back button displayed in the application program window for each of the application programs. Unless a display use state change is encountered, each of these back stacks eventually leads to a single-display home screen on the respective display surface. If the retrieved display use state indicates that an about-to-be-restored application state was also in a full-size window mode, but swapped to the other display surface (relative to the current display use state), then the system toggles a display swap as part of the restore action, so the two visible application program window images and their associated navigation bars swap displays with each other.

If the touch screen apparatus is in a full-screen mode and the retrieved display use state indicates that about-to-be-restored application state was in a full-size window mode, then the system toggles the application program window image from full-screen mode to full-size window mode as part of the restore action. With a single application program running in full-size window mode, only a single back button (and back stack) is available to the user. When tapping the back button, the back stack goes through its full-size window mode application state records. Unless a display use state change is encountered, the back stack leads to at least one full-size window home screen as the end state.

If the touch screen apparatus is in a full-screen mode and the retrieved display use state indicates that the about-to-be-restored application state was in a full-size window mode, but with a second application program window also displayed, then the system toggles the application program window image from the full-screen mode to the full-size window mode, placing the about-to-be-restored application window image on the same display surface that is indicated by the retrieved display use state. On the second (now available) display surface, the second application program, the one whose window image was shown on the second display surface before the full-screen mode was invoked, is made visible and active again, along with its associated navigation bar and back stack, with the second application window image again displayed on the second display surface.

In accordance with one embodiment, the result is an experience in which a back button acts in contextual harmony with the application program in its immediate context across a variety of situations. This solution is compatible with existing back stack conventions: The existing in-application use of the back stack is preserved. The application exerts control over which application states get captured in the back stack. The existing system level rules for the back stack also remain valid. An application program does not need to provision any special content to work with the multi-display back stack. The system simply adds display use information to the entries. The back stacks are enriched with display state information.

Many types of touch screen apparatus having a single touch screen panel have been produced, and many application programs designed to be used on touch screen apparatus having only a single touch screen panel (i.e., single-display application programs) have been written for them. Such single-display application programs are unaware of the multiple displays of a multi-display device. Such single-display application programs were written with the understanding that, at any given time, at most a single application program would be providing the single application program window image being displayed so as to cover the extent of the single touch screen panel of the touch screen apparatus.

A system and method for running application programs which are unaware of multiple displays successfully on a multi-display device is provided. In one embodiment, a virtual single-display device is provided to application programs on a touch screen apparatus having a plurality of displays. The application programs unaware of the multiple displays are provided with an interface that emulates the interface the application programs expect to have with a touch screen apparatus limited to having only a single display. Such a virtual single-display device, presented through such an interface, may be implemented by a software layer that gives an application program running on top of it the impression that it is running on a single-display device. This virtual single-display device includes a virtual single display, as well as a virtual set of sensors that provide orientation and motion information to application programs (mapped to the appropriate physical set of sensors), to serve the expectations of any given application program. One embodiment may be implemented on touch screen apparatus comprising multiple touch screen panels. One embodiment may be implemented on touch screen apparatus comprising a single touch screen display large enough to display two sets of content side-by-side (e.g., all-in-ones, high resolution tablets, etc.).

For the case where it is desired for the application program to run on one specific display, the application program is provided with an impression that it runs on a virtual display that matches the pixel dimensions of one single actual display. For the case where it is desired for the application program to span multiple displays, the application program is provided with the impression that it runs on a virtual display of the combined size of multiple physical displays. Each application program is provided with its own set of expected system services, such as access to sensors and camera. The application program is not required to conform to any customization requirements pertinent to a multiple-display device.

In one embodiment, a user experience solution having a concurrent-use experience, where two application programs can be used side-by-side on two displays, under intuitive control by the user, is provided. Support for multiple simultaneous presentation of window images of two application programs expands the capabilities of an underlying operating system that was designed for a single-application-program-at-a-time experience on a single-display touch screen apparatus. The standard system-provided user experiences are refactored to access, launch and manage application programs. The refactoring of single-display contextual controls for application programs to work in a multi-display context is provided.

In one embodiment, a dual-display device with a hinge between two touch screen panels on which the displays are presented, as an example, has a primary (physical) display and a base display, where the primary display is identified as the one which has the device camera placed next to it. On such a device, a set of preferred device orientations is identified as a baseline, and the modes in which the displays operate are made to respond to such device orientations. The preferred orientations are "Primary Display Up" for using the device in landscape orientation and "Primary Display on the Right" for portrait orientation. Both displays are treated as equal peers, the term "primary" merely refers to the equivalent positioning of the display on a clamshell single-display laptop. The same experience that is being defined for the primary orientations is also available for the non-preferred orientations that result from rotating the device by 180 degrees.

Within the primary orientations, a set of device postures can be detected, such as Laptop (Clamshell)/Tablet, Media, 360 for Landscape orientation and Book/Tablet, 360 for Portrait orientation. These postures provide either dual or single display operation, as a matrix against which a consistent set of experiences is delivered.

The standard experience components, which are standardized control icons or buttons that provide standardized control responses across all applications, as well as window images displayed by the operating system rather than by application programs running on the operating system, are adapted to support multi-display use. The system environment, experienced by the user when accessing the device, when choosing, launching, switching or managing application programs, is modified from the standard single-display user experience to a solution that can cater to both dual and single-display use while still emulating the interface for a single-display device from the perspective of the application program.

The lock screen, a standard part of the device user experience, is a window image that provides access to the device and exposes additional functionality. For dual-display use, the lock screen is reformatted so that it can present the same functionality and information appropriately per device orientation, maintaining consistency with single-display use. In landscape orientation, the "Widgets" section of the screen is positioned on the left on the primary (upper) display. The "Unlock" function, along with the "Shortcuts" and "Account Choice," is positioned on the right on the base (lower) display. In portrait orientation, the "Widgets" section of the screen is positioned on the upper half of the left (primary) display. The "Unlock" function, along with the "Shortcuts" and "Account Choice," is positioned on the lower half of the right (base) display.

The home screen is a window image that allows a user to launch application programs based on application program icons displayed on the home screen. The home screen shows a horizontally scrolling grid that hosts user-chosen application program shortcuts and widgets. For dual-display use, this grid is stretched across both displays, maintaining the same number of visible grid positions. The home screen also contains some non-scrolling elements along its edges, which are kept in place for dual-display use and which are repeated per display as needed. Specifically, dual Shortcut trays are provided, so the All Application Programs entry point contained in the shortcut tray is available for either display. For the case where the home screen is accessed from the context of an application program running in single-display mode (occupying only one of the two displays), the home screen is shown in single-display mode, like on a single-display device, on the same display.

The All Application Programs Screen is a window image which shows all application program shortcuts in a scrolling grid. The All Application Programs Screen is not stretched for dual-display use, but instead invoked and shown on a per-display basis, allowing the user to determine on which display to launch an application program by accessing the All Application Programs screen on that respective display.

The Recents Screen (sometimes also called "App Switcher") is a window image which provides access to recently used application programs. For dual-display use, the Recents Screen is provided on a per-display basis, allowing the user to choose a recent application program to replace only one currently running application program, leaving the other one on the other display alone. For the case of a single application program running across both displays, the Recents Screen is still shown on only one display, but replaces the dual-display application program with the chosen recent application program also in dual-display mode.

A touch screen apparatus with a standard single display which displays a single application program at a time provides an application program with a set of contextual controls: These contextual controls include a Back button, a way to return to an application program launcher, and a way to switch the currently shown application program to a recent one. In one example, these contextual controls are a Back button, a Home button, and a Recents button. For dual-display use, one instance of this set of contextual controls is provided per application program, so that of two application programs running side by side, on their own displays, each application program has its own Back, Home, and Recents button. These buttons, along with the Navigation bar hosting them, are positioned underneath each application program, along the bottom of either display, leading to a set of application-program-plus-navigation bar configurations specific to the orientation of the device. To provide the user with the option to determine which display to run an application program on, or to run an application program across both displays, a set of additional buttons is added to the navigation bar to swap application programs between displays and to toggle an application program from single to dual display use and from dual to single display use.

Figure 12:
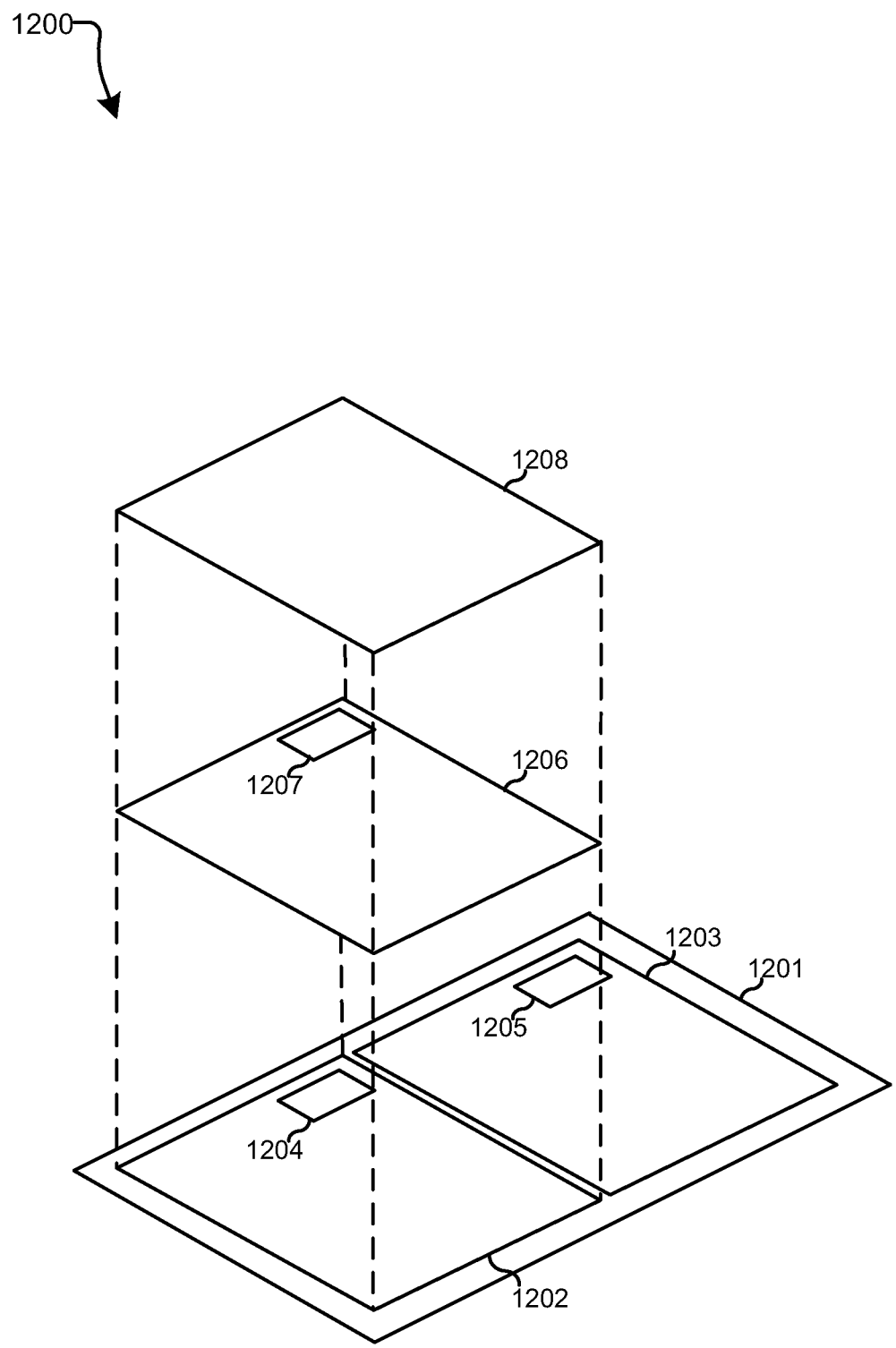
FIG. 12 is a block diagram illustrating an architecture 1200 for the provision of a virtual display and virtual sensors for a single-display application program on a single touch screen panel of a multi-display touch screen apparatus according to an embodiment of the disclosure.

FIG. 12 is a block diagram illustrating an architecture 1200 for the provision of a virtual display and virtual sensors for a single-display application program on a single touch screen panel of a multi-display touch screen apparatus according to an embodiment of the disclosure. Multi-display touch screen apparatus 1201 comprises a physical display 1202 and a physical display 1203. Physical display 1202 may be a first touch screen panel, and physical display 1203 may be second touch screen panel. Multi-display touch screen apparatus 1201 comprises physical sensors including a first subset 1204 of physical sensors and a second subset 1205 of physical sensors. A single-display application program providing window image 1208 is designed to operate on a single-display touch screen apparatus having only a single touch screen panel. To enable use of the single-display application program on multi-display touch screen apparatus 1201, an interface comprising virtual display 1206 and virtual sensors 1207 is provided. The single-display application program interacts with the interface as if it were being executed on a single-display touch screen apparatus. The single-display application program is provided with specifications, such as screen dimensions, of virtual display 1206 configured to emulate the display of a single-display touch screen apparatus. The single-display application program is provided with information to access virtual sensors 1207 configured to emulate the sensors of a single-display touch screen apparatus. Thus, window image 1208 is displayed with respect to virtual display 1206, which is mapped to physical display 1202 such that window image 1208 is displayed on physical display 1202. Through the use of virtual display 1206, the single-display application program is not subjected to ambiguity as to whether, for example, window image 1208 is to be displayed on physical display 1202 or physical display 1203. The single-display application does not need to provide support for differences of physical displays 1202 and 1203 from a single display of a single-display touch screen apparatus, for example, differences in the screen dimensions or in the manner the touch screen apparatus operating system manages physical displays 1202 and 1203.

Figure 13:
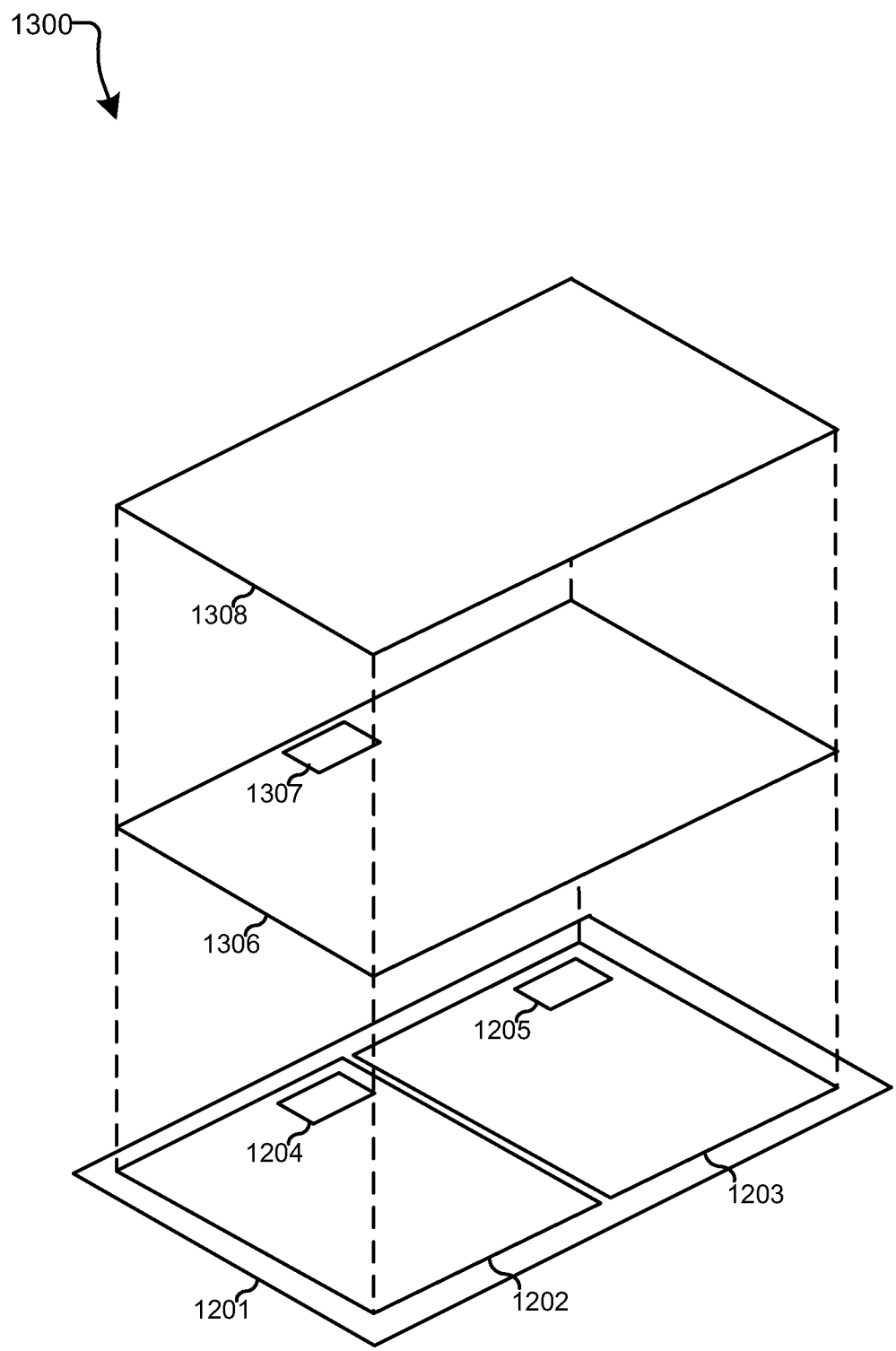
FIG. 13 is a block diagram illustrating an architecture 1300 for the provision of a virtual display and virtual sensors for a single-display application program across multiple touch screen panels of a multi-display touch screen apparatus according to an embodiment of the disclosure.

FIG. 13 is a block diagram illustrating an architecture 1300 for the provision of a virtual display and virtual sensors for a single-display application program across multiple touch screen panels of a multi-display touch screen apparatus according to an embodiment of the disclosure. A single-display application program providing window image 1308 is designed to operate on a single-display touch screen apparatus having only a single touch screen panel. To enable use of the single-display application program on multi-display touch screen apparatus 1201, an interface comprising virtual display 1306 and virtual sensors 1307 is provided. The single-display application program interacts with the interface as if it were being executed on a single-display touch screen apparatus. The single-display application program is provided with specifications, such as screen dimensions, of virtual display 1306 configured to emulate the display of a single-display touch screen apparatus. The single-display application program is provided with information to access virtual sensors 1307 configured to emulate the sensors of a single-display touch screen apparatus. Thus, window image 1308 is displayed with respect to virtual display 1306, which is mapped to physical displays 1202 and 1203 such that window image 1308 is displayed across both of physical displays 1202 and 1203. Through the use of virtual display 1306, the single-display application program is not subjected to ambiguity as to whether, for example, window image 1308 is to be displayed on physical display 1202 or physical display 1203 individually. The single-display application does not need to provide support for differences of physical displays 1202 and 1203 from a single display of a single-display touch screen apparatus, for example, differences in the screen dimensions or in the manner the touch screen apparatus operating system manages physical displays 1202 and 1203.

Figure 14:
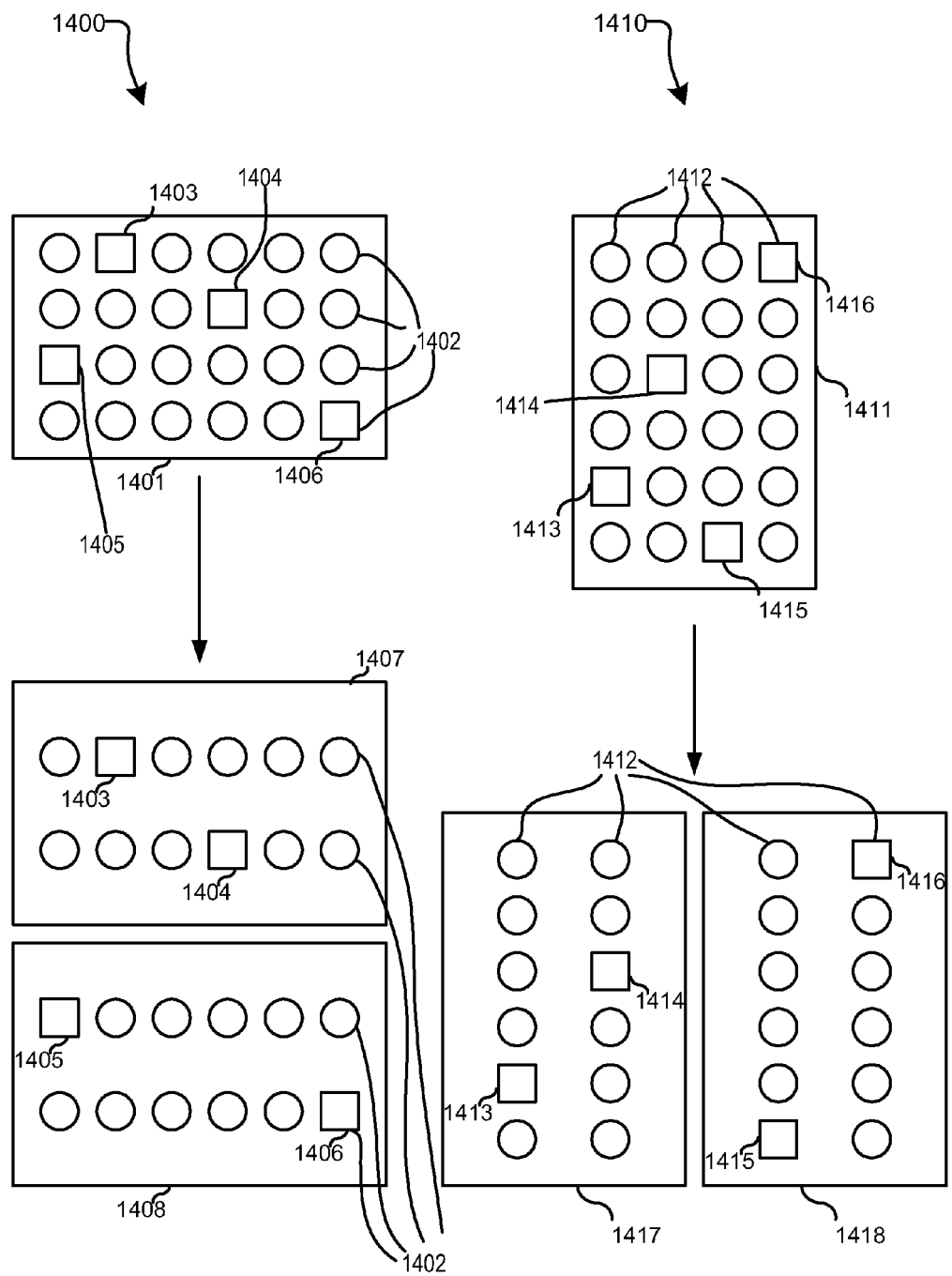
FIG. 14 is an elevation view diagram illustrating adaptation of a home screen from a single touch screen panel to multiple touch screen panels in a landscape mode 1400 and in a portrait mode 1410 according to an embodiment of the disclosure.

FIG. 14 is an elevation view diagram illustrating adaptation of a home screen from a single touch screen panel to multiple touch screen panels in a landscape mode 1400 and in a portrait mode 1410 according to an embodiment of the disclosure. In the landscape mode 1400, single-display home screen 1401 includes all of application program icons 1402 on a single touch screen panel. To show the organization of individual application program icons, the positions of application program icons 1403, 1404, 1405, and 1406 are shown individually.

To display the application program icons 1402 on a multi-display touch screen apparatus, application program icons 1402 are spread out over a first display home screen 1407 displayed on a first touch screen panel and second display home screen 1408 displayed on a second touch screen panel. As shown in the illustrated example, the upper two rows of application program icons 1402, including application program icons 1403 and 1404, are displayed on the first display home screen 1407, and the lower two rows of application program icons 1402, including application program icons 1405 and 1406, are displayed on the second display home screen 1408.

In the portrait mode 1410, single-display home screen 1411 includes all of application program icons 1412 on a single touch screen panel. To show the organization of individual application program icons, the positions of application program icons 1413, 1414, 1415, and 1416 are shown individually.

To display the application program icons 1412 on a multi-display touch screen apparatus, application program icons 1412 are spread out over a first display home screen 1417 displayed on a first touch screen panel and second display home screen 1418 displayed on a second touch screen panel. As shown in the illustrated example, the left two rows of application program icons 1412, including application program icons 1413 and 1414, are displayed on the first display home screen 1417, and the right two rows of application program icons 1412, including application program icons 1415 and 1416, are displayed on the second display home screen 1418.

Figure 15:
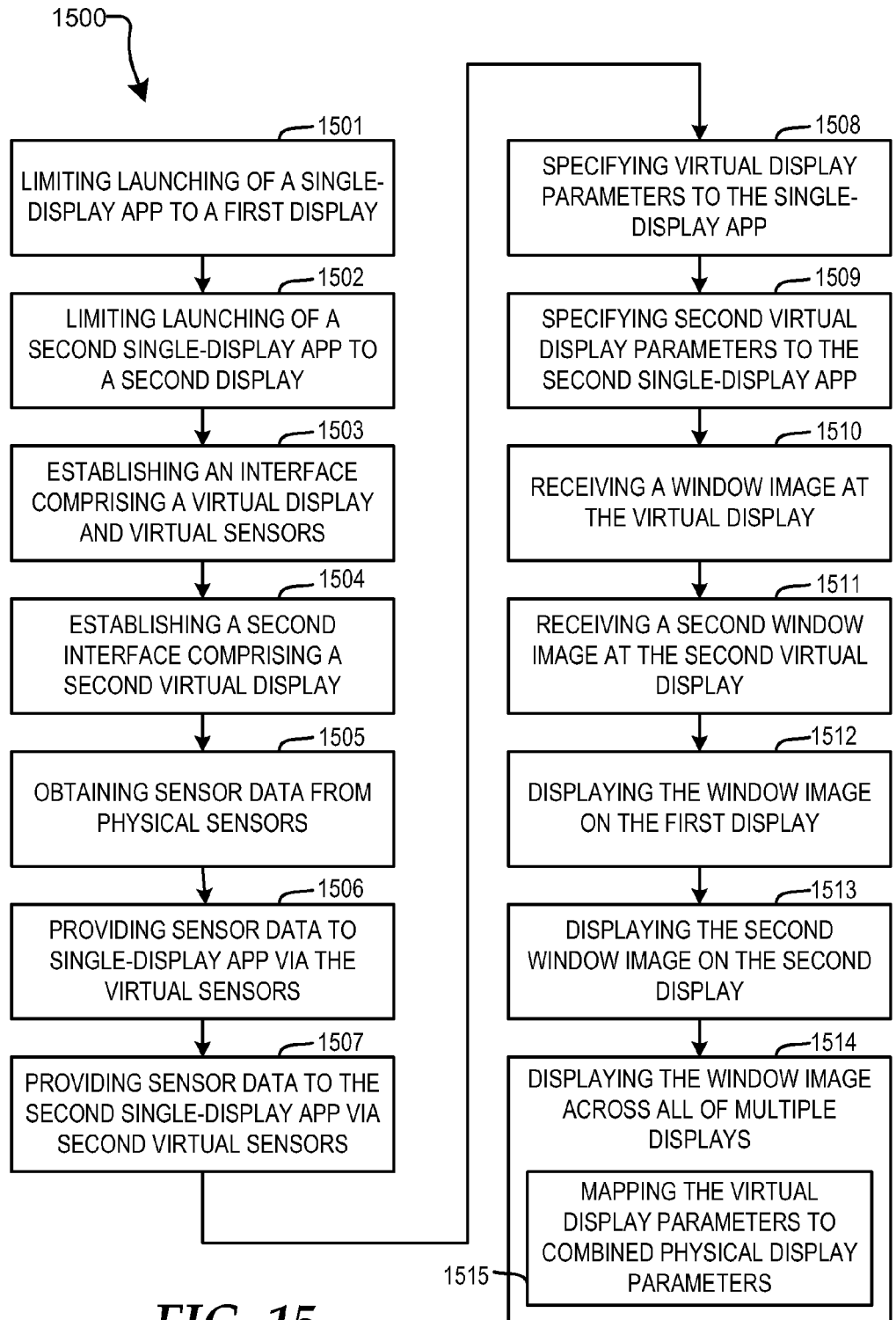
FIG. 15 is an flow diagram illustrating a method 1500 for execution of a single-display application program on a multi-display touch screen apparatus using a virtual display and virtual sensors according to an embodiment of the disclosure.

FIG. 15 is an flow diagram illustrating a method 1500 for execution of a single-display application program on a multi-display touch screen apparatus using a virtual display and virtual sensors according to an embodiment of the disclosure. The method begins in block 1501. In block 1501, the launching of a single-display application program (i.e., app) from a first application program icon on a first one of multiple displays of the multi-display touch screen apparatus is limited such that the window image is displayed specifically on the first one of the multiple displays. From block 1501, the method continues in block 1502. In block 1502, the launching of a second single-display application program from a second application program icon on a second one of the multiple displays is limited such that the second window image is displayed specifically on the second one of the multiple displays. From block 1502, the method continues to block 1503. In block 1503, on a multi-display touch screen apparatus executing a single-display application program, an interface between the multi-display touch screen apparatus and the single-display application program is established, the interface comprising a virtual display and virtual sensors. From block 1503, the method continues to block 1504. In block 1504, a second interface between the multi-display touch screen apparatus and a second single-display application program is established, the second interface comprising a second virtual display. From block 1504, the method continues to block 1505. In block 1505, sensor data is obtained from physical sensors of the multi-display touch screen apparatus. From block 1505, the method continues in block 1506. In block 1506, at least a first subset of the sensor data is provided to the single-display application program via the virtual sensors of the interface.

From block 1506, the method continues in block 1507. In block 1507, at least a second subset of the sensor data is provided to the second single-display application program via second virtual sensors of the interface. In accordance with one embodiment, the first subset of the sensor data is obtained from a primary sensor hub of the physical sensors and wherein the second subset of the sensor data is obtained from a base sensor hub of the physical sensors. From block 1507, the method continues to block 1508. In block 1508, virtual display parameters which emulate single display parameters of a single-display touch screen apparatus are specified to the single-display application program. From block 1508, the method continues to block 1509. In block 1509, the virtual display parameters which emulate the single display parameters of a single-display touch screen apparatus are specified to the second single-display application program. From block 1509, the method continues to block 1510. In block 1510, a window image to be displayed from the single-display application is received at the virtual display of the interface. From block 1510, the method continues to block 1511. In block 1511, a second window image to be displayed from the second single-display application is received at the second virtual display of the interface. From block 1511, the method continues to block 1512. In block 1512, the window image is displayed on at least a first one of multiple displays of the multi-display touch screen apparatus. From block 1512, the method continues to block 1513. In block 1513, the second window image on a second one of the multiple displays of the multi-display touch screen apparatus.

The method also supports switching to another display mode, such as displaying the window image across all of the multiple displays. In accordance with such an embodiment, the method continues from block 1513 to block 1514. In block 1514, the window image is displayed across all of the multiple displays of the multi-display touch screen apparatus. In accordance with one embodiment, the displaying the window image across all of the multiple displays comprises mapping the virtual display parameters to combined physical display parameters of all of the multiple displays of the multi-display touch screen apparatus, as shown in block 1515.

In accordance with one embodiment, an information handling system comprises a plurality of physical displays, plurality of physical sensors, a processor coupled to the plurality of physical displays for controlling images displayed on the plurality of physical displays and coupled to the plurality of physical sensors for receiving sensor data from the plurality of physical sensors, and a memory for storing processor instructions, the processor instructions for causing the processor to execute a single-display application program, to establish an interface between at least one of the physical displays and the single-display application program, the interface comprising a virtual display and virtual sensors, wherein at least a first subset of the sensor data is provided to the single-display application program via the virtual sensors of the interface, wherein virtual display parameters which emulate single display parameters of a single-display touch screen apparatus are specified to the single-display application program, wherein a window image to be displayed is received from the single-display application at the virtual display of the interface, and wherein the window image is displayed on at least a first one of the physical displays. In accordance with one embodiment, the processor instructions further cause the processor to establish a second interface between the multi-display touch screen apparatus and a second single-display application program, the second interface comprising a second virtual display, wherein the virtual display parameters which emulate the single display parameters of a single-display touch screen apparatus are specified to the second single-display application program, wherein a second window image to be displayed is received from the second single-display application at the second virtual display of the interface, wherein the second window image is displayed on a second one of the physical displays.

In accordance with one embodiment, at least a second subset of the sensor data is provided to the second single-display application program via second virtual sensors of the interface. In accordance with one embodiment, the first subset of the sensor data is obtained from a primary sensor hub of the physical sensors and wherein the second subset of the sensor data is obtained from a base sensor hub of the physical sensors. In accordance with one embodiment, the launching of the single-display application program from a first application program icon on the first one of the physical displays is limited such that the window image is displayed specifically on the first one of the physical displays, and the launching of the second single-display application program from a second application program icon on the second one of the physical displays is limited such that the second window image is displayed specifically on the second one of the physical displays.

In accordance with one embodiment, the window image is displayed across all of the physical displays. In accordance with one embodiment, the displaying of the window image across all of the physical displays is performed by mapping the virtual display parameters to combined physical display parameters of all of the physical displays.

In accordance with one embodiment, a method comprises, on a multi-display touch screen apparatus, displaying a home screen having a first icon for a first single-display application program on a first touch screen panel and a second icon for a second single-display application program on a second touch screen panel, launching the first single-display application program in response to a first indication of selection of the first icon, launching the second single-display application program in response to a second indication of selection of the second icon, specifying to the first and second single-display application programs virtual display parameters which emulate single display parameters of a single-display touch screen apparatus, displaying a first window image of the first single-display application program on the first touch screen panel, displaying a second window image of the second single-display application program on the second touch screen panel, obtaining sensor data from physical sensors of the multi-display touch screen apparatus, providing at least a first subset of the sensor data to the first single-display application program, and providing at least a second subset of the sensor data to the second single-display application program. In accordance with one embodiment, the first subset of the sensor data are obtained from a primary sensor hub of the physical sensors and wherein the second subset of the sensor data are obtained from a base sensor hub of the physical sensors. In accordance with one embodiment, the method further comprises receiving a full-screen indication that a selected one of the first and second single-display application programs has been selected to be displayed across both the first touch screen panel and the second touch screen panel and displaying a selected one of the first window image and the second window image corresponding to the selected one of the first and second single-display application programs across both the first touch screen panel and the second touch screen panel. In accordance with one embodiment, a non-selected one of the first window image and the second window image is not displayed on either the first touch screen panel or the second touch screen panel when the selected one of the first window image and the second window image is displayed across both the first touch screen panel and the second touch screen panel.

In accordance with one embodiment, the first touch screen display is a primary display and the second touch screen display is a base display. In accordance with one embodiment, the first subset of the sensor data is obtained from a primary sensor hub of the physical sensors and wherein the second subset of the sensor data is obtained from a base sensor hub of the physical sensors.

In accordance with one embodiment, a method comprises adding an entry to a last-in-first-out (LIFO) data structure, the entry comprising application state information descriptive of an application state of a software application and display state information descriptive of a display state of a display surface of a touch screen device, adjusting a LIFO data structure pointer to reflect a revised LIFO data structure state resulting from the adding the entry, receiving a back button actuation indication, in response to receiving the back button actuation indication, restoring the software application to the application state and restoring the display surface to the display state, and readjusting the LIFO data structure pointer to reflect an original LIFO data structure state that existing prior to the adding the entry. In accordance with one embodiment, the method further comprises determining a change in the display state of the display surface and, in response to determining the change in the display state of the display surface, truncating the LIFO data structure. As an example, the LIFO data structure may be truncated in response to detection of a change of device postures which changes a display configuration, such as changing from a single display panel mode to a dual display panel mode, from a dual display panel mode to a single display panel mode, or from one display orientation to another. In accordance with one embodiment, the method further comprises, in response to truncating the LIFO data structure, reverting at least a portion of the display surface to a home screen upon receiving the back button actuation indication. In accordance with one embodiment, the truncating comprises resetting the LIFO data structure pointer to a bottom of the LIFO data structure. In accordance with one embodiment, the display state pertains to a dual display, the dual display displaying a first graphic user interface (GUI) of a first software application on a first display portion and a second GUI of a second software application on a second display portion. In accordance with one embodiment, the method further comprises displaying a first button bar comprising a first back button on the first display portion, the first back button corresponding to the first software application, and displaying a second button bar comprising a second back button on the second display portion, the second back button corresponding to the second software application. In accordance with one embodiment, the method further comprises displaying, in a single-display display state, the first GUI and the first button bar but not the second GUI and not the second button bar.

In accordance with one embodiment, an information handling system comprises a display surface having a display state, a processor coupled to the display surface for controlling images displayed on the display surface, and a memory for storing a last-in-first-out (LIFO) data structure and for storing processor instructions, the processor instructions for causing the processor to add an entry to the LIFO data structure, the entry comprising application state information descriptive of an application state of a software application and display state information descriptive of a display state of the display surface, wherein a graphic user interface (GUI) of the software application is displayed on the display surface, to adjust a LIFO data structure pointer to reflect a revised LIFO data structure state resulting from adding the entry, to receive a back button actuation indication from the display surface, and, in response to receiving the back button actuation indication, to restore the software application to the application state and restoring the display surface to the display state and to readjust the LIFO data structure pointer to reflect an original LIFO data structure state that existing prior to the adding the entry. In accordance with one embodiment, the processor instructions further cause the processor to determine a change in the display state of the display surface and, in response to determining the change in the display state of the display surface, to truncate the LIFO data structure. In accordance with one embodiment, the processor instructions further cause the processor, in response to truncating the LIFO data structure, to revert at least a portion of the display surface to a home screen upon receiving the back button actuation indication. In accordance with one embodiment, to truncate the LIFO data structure, the processor resets the LIFO data structure pointer to a bottom of the LIFO data structure. In accordance with one embodiment, the display state pertains to a dual display, the dual display displaying the graphic user interface (GUI) of a first software application on a first display portion and a second GUI of a second software application on a second display portion. In accordance with one embodiment, the display surface displays a first button bar comprising a first back button on the first display portion, the first back button corresponding to the first software application, and displays a second button bar comprising a second back button on the second display portion, the second back button corresponding to the second software application. In accordance with one embodiment, the display surface displays, in a single-display display state, the first GUI and the first button bar but not the second GUI and not the second button bar.

In accordance with one embodiment, a method comprises adding an entry to a last-in-first-out (LIFO) data structure, the entry comprising former application state information descriptive of an application state of a software application, adjusting a LIFO data structure pointer to reflect a revised LIFO data structure state resulting from the adding the entry, determining when a change of a display state of a display surface of a touch screen device has occurred, wherein the change is from a single-display display state to a dual-display display state or from a dual-display display state to a single-display display state, receiving a back button actuation indication, in response to receiving the back button actuation indication when the change of the display state has not occurred, restoring the software application to the application state and restoring the display surface to the display state and readjusting the LIFO data structure pointer to reflect an original LIFO data structure state that existing prior to the adding the entry, and, in response to receiving the back button actuation indication when the change of the display state has occurred, reverting at least a portion of the display surface to a home screen. In accordance with one embodiment, the method further comprises, in response to determining the change in the display state of the display surface, truncating the LIFO data structure. In accordance with one embodiment, the truncating comprises resetting the LIFO data structure pointer to a bottom of the LIFO data structure. In accordance with one embodiment, the dual-display display state pertains to a dual display, the dual display displaying a first graphic user interface (GUI) of the software application on a first display portion and a second GUI of a second software application on a second display portion. In accordance with one embodiment, the method further comprises displaying a first button bar comprising a first back button on the first display portion, the first back button corresponding to the first software application and displaying a second button bar comprising a second back button on the second display portion, the second back button corresponding to the second software application. In accordance with one embodiment, the method further comprises, for the single-display display state, displaying the first button bar but not the second button bar.

In an alternative embodiment, dedicated hardware implementations such as application specific integrated circuits, programmable logic arrays and other hardware devices can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein can be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives can be considered a distribution medium that is equivalent to a tangible storage medium. Accordingly, the disclosure is considered to include any one or more of a computer-readable medium or a distribution medium and other equivalents and successor media, in which data or instructions can be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device such as a video game controller, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g., random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system can themselves be considered information handling systems.

When referred to as a "device," a "module," or the like, the embodiments described herein can be configured as hardware. For example, a portion of an information handling system device can be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed:

1. A method comprising:
a first application state of a first software application executed by a processor and a first display state of a display surface having a first entry stored in a last-in-first-out (LIFO) data structure in memory, wherein the first entry comprises application state information and display state information corresponding to the first application state of the first software application relating to a progression level of execution of the first software application and the first display state of the progression state of execution of the first software application to generate a plurality of interactive objects to be displayed output for commands to the first software application in a window on the display surface where the displayed output changes at different progression levels of the first software application and where the display state information further includes the configuration data for location, size and orientation of the interactive objects within the window displayed on the display surface housed in two display housings of a convertible information handling system;
adding a second entry to the LIFO data structure in memory via the processor executing instructions, the second entry comprising application state information descriptive of a second application state of a second progression level of execution the first software application and display state information descriptive of a second display state of displayed output at the second progression level of execution of the display surface, wherein the display surface has a touch screen input device;
adding a third entry to the LIFO data structure in memory via the processor executing instructions, the third entry comprising application state information descriptive of a first application state relating to a first progression level of execution of a second software application and display state information descriptive of a third display state of displayed output at the first progression level of the second software application on the display surface;
adjusting a LIFO data structure pointer to reflect a revised LIFO data structure state resulting from adding the second entry and the third entry;
receiving a back button actuation indication;
in response to receiving the back button actuation indication, restoring the first software application from the first application state of the second application to the second application state of the first software application and restoring the display surface to the second display state if the window state has changed; and
readjusting the LIFO data structure pointer to reflect the LIFO data structure display state that existed prior to the adding the third entry.

2. The method of claim 1 further comprising:
determining a change in the display state information relating to the first or second display state of the display surface, wherein the change in the display state information results from a change of a device posture, truncating the LIFO data structure for display state.

3. The method of claim 2 further comprising:
in response to truncating the LIFO data structure, reverting at least a portion of the display surface to a home screen upon receiving the back button actuation indication.

4. The method of claim 2 wherein the truncating comprises:
resetting the LIFO data structure pointer to a bottom of the LIFO data structure.

5. The method of claim 1 wherein the display state information relating to the first display state, the second display state, or the third display state pertains to a dual display, the dual display displaying the displayed output as a first graphic user interface (GUI) of the first software application on a first display portion and a second GUI of the second software application on a second display portion.

6. The method of claim 5 further comprising:
displaying a first button bar comprising a first back button on the first display portion, the first back button corresponding to the first software application; and
displaying a second button bar comprising a second back button on the second display portion, the second back button corresponding to the second software application.

7. The method of claim 6 further comprising:
displaying, in a single-display display state, the first GUI and the first button bar but not the second GUI and not the second button bar.

8. An information handling system comprising:
a display across a plurality of display housings wherein the display housings are reconfigurable, the display having a first display state of displayed output at a first progression level of a software application;
a processor executing processor instructions, the processor coupled to the display for controlling images displayed on the display according to the first display state or other display states of an application window displayed reflecting size across the display on one or both housings, orientation on the display, and location across the display on one or both housings; and a memory including a first last-in-first-out (LIFO) data structure for storing the first display state and a second LIFO data structure for storing a first application state descriptive of a progression state of execution of a software application to generate a plurality of interactive objects as the displayed output of the first display state to be displayed in a window on the display for interfacing with the software application and that the displayed output may change at different progression levels of the software application, wherein the first display state relates to the first application state further includes the configuration data for location, size and orientation of the interactive objects within the window displayed on the display and where the display state and application state are associated between the first LIFO data structure and the second LIFO data structure;

the processor executing the processor instructions to add an entry to the second LIFO data structure, the entry comprising a second application state information descriptive of a second progression state of execution of the software application and to add an entry to the first LIFO data structure of a second display state information descriptive of a second display state at the second progression state of execution at the display, wherein the display state information includes a graphic user interface (GUI) including the configuration data for location, size and orientation of the interactive objects within the window displayed on the display for the software application as the displayed output of the first or second display states and wherein the second application state is associated with the second display state, the processor to adjust LIFO data structure pointers to reflect a revised LIFO data structure state of the first and second LIFO data structures resulting from adding the entries;

the processor executing processor instructions to receive a back button actuation indication from the display, and, in response to receiving the back button actuation indication, to restore the software application to the first application state and restoring the display surface to the first display state and to readjust the LIFO data structure pointers.

9. The information handling system of claim 8 wherein the processor instructions further cause the processor to determine a change in the second display state of the display and, in response to determining the change in the second display state of the display, wherein the change in the second display state results from a change of a device posture, to truncate the LIFO data structure.

10. The information handling system of claim 9 wherein the processor instructions further cause the processor, in response to truncating the LIFO data structure, to revert at least a portion of the display to a home screen upon receiving the back button actuation indication.

11. The information handling system of claim 9 wherein, to truncate the LIFO data structure, the processor resets the LIFO data structure pointer to a bottom of the LIFO data structure.

12. The information handling system of claim 8 wherein the first display state or the second display state pertains to a dual display, the dual display displaying the display output as the graphic user interface (GUI) of a first software application on a first display portion and a second GUI of a second software application on a second display portion.

13. The information handling system of claim 12 wherein the display displays a first button bar comprising a first back button on the first display portion, the first back button corresponding to the first software application, and displays a second button bar comprising a second back button on the second display portion, the second back button corresponding to the second software application.

14. The information handling system of claim 13 wherein the display displays, in a single-display display state, the first GUI and the first button bar but not the second GUI and not the second button bar.

15. A method comprising:
storing a first application state of a first progression level of execution for a first software application executing via a processor and a first display state of display output at the first progression level of execution in a display window as a first entry stored in a last-in-first-out (LIFO) data structure comprising entries of application state information and display state information, wherein display states are of displayed output in a displayed application window reflecting size across the display on one or both housings, orientation on the display, and location across the display on one or both housings of a convertible information handling system including the configuration data for location, size and orientation of the interactive objects within the window and wherein application states are descriptive of a progression state of execution of the first software application to generate a plurality of interactive objects for interfacing with the first software application as the displayed output of the first display state to be displayed in the window on the display and where the display states may change at different progression levels of the first software application;

storing a second entry to the LIFO data structure, via a processor executing instructions, the entry comprising former second application state information descriptive of a second, previous application state for a previous second progression level of execution of the first software application and a second, previous display state of display output at that previous second progression level of execution;

adjusting a LIFO data structure pointer to reflect a revised LIFO data structure state resulting from adding the first entry;

determining when a change of the first display state of the display via a touch screen device has occurred, wherein the change is from a single-display display state for the application window in a single housing to a dual-display display state for the application window across both housings or the change is from a dual-display display state to a single-display display state;

receiving a back button actuation indication;

in response to receiving the back button actuation indication when the change of the first display state has not occurred, restoring the first software application to the first application state and restoring the display to the first display state and readjusting the LIFO data structure pointer to reflect an original LIFO data structure state that existing prior to the adding the first entry; and in response to receiving the back button actuation indication when the change of the first display state has occurred, reverting at least a portion of the display to a home screen.

16. The method of claim 15 further comprising:
in response to determining the change in the first display state of the display, wherein the change in the first display state results from a change of a device posture, truncating the LIFO data structure.

17. The method of claim 16 wherein the truncating comprises:
resetting the LIFO data structure pointer to a bottom of the LIFO data structure.

18. The method of claim 15 wherein the dual-display display state pertains to a dual display, dual display displaying a first graphic user interface (GUI) of the first software application on a first display portion and a second GUI of a second software application on a second display portion.

19. The method of claim 18 further comprising:
displaying a first button bar comprising a first back button on the first display portion, the first back button corresponding to the first software application; and
displaying a second button bar comprising a second back button on the second display portion, the second back button corresponding to the second software application.

20. The method of claim 19 further comprising:
for the single-display display state, displaying the first button bar but not the second button bar.

\* \* \* \* \*